(12) United States Patent
Takeo

(10) Patent No.: US 6,418,237 B1
(45) Date of Patent: Jul. 9, 2002

(54) ABNORMAL PATTERN DETECTION PROCESSING METHOD AND SYSTEM AND IMAGE DISPLAY TERMINAL

(75) Inventor: Hideya Takeo, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/382,804

(22) Filed: Aug. 25, 1999

(30) Foreign Application Priority Data

Aug. 25, 1998 (JP) .......................................... 10-238736
Jun. 25, 1999 (JP) .......................................... 11-179922

(51) Int. Cl.$^7$ ................................................. G06K 9/00
(52) U.S. Cl. ...................................... 382/128; 382/190
(58) Field of Search ................................ 382/128–133, 382/190, 308; 378/62; 250/587; 600/373, 374, 453, 518; 606/41

(56) References Cited

U.S. PATENT DOCUMENTS

| | | | | |
|---|---|---|---|---|
| 5,319,549 A | * | 6/1994 | Katsuragawa et al. ...... | 382/108 |
| 5,761,334 A | | 6/1998 | Nakajima et al. ........... | 382/132 |
| 5,776,063 A | * | 7/1998 | Ditrich et al. ............... | 600/408 |
| 5,784,482 A | * | 7/1998 | Nakajima .................... | 382/132 |
| 6,011,862 A | * | 1/2000 | Doi et al. .................... | 382/132 |

OTHER PUBLICATIONS

Japanese Unexamined Patent Publication No. 8(1996)–294479 corresponds to USP 5,761,334.
Japanese Unexamined Patent Publication No. 8(1996)–287230 corresponds to USP 5,761,334.

* cited by examiner

Primary Examiner—Jayanti K. Patel
(74) Attorney, Agent, or Firm—Sughrue Mion, PLLC

(57) ABSTRACT

Abnormal pattern detection processing is performed on an entire area image signal, which represents an entire area image, and an abnormal pattern embedded in the entire area image is detected. A local area limited region, which is constituted of the detected abnormal pattern and a region neighboring with the abnormal pattern, is set as a region-of-interest image. Information defined in one of (1), (2), (3), and (4) below is fed into an external image display terminal: (1) the entire area image signal and a detection result signal, which represents detection results of the abnormal pattern having been detected, (2) the entire area image signal, the detection result signal, and a region-of-interest image signal, which represents the region-of-interest image, (3) an embedding entire area image signal representing an embedding entire area image, which is formed by embedding the detection results of the abnormal pattern into the entire area image, and (4) the embedding entire area image signal and the region-of-interest image signal.

34 Claims, 10 Drawing Sheets

ABNORMAL PATTERN DETECTION PROCESSING METHOD AND SYSTEM AND IMAGE DISPLAY TERMINAL

BACKGROUND OF THE INVENTION

1. Field of the Invention

This invention relates to an abnormal pattern detection processing method and system and an image display terminal adapted to the utilization of image signals received from the abnormal pattern detection processing system. This invention particularly relates to an improvement in processing of image signals to be fed into the image display terminal, or the like, and an improvement in processing of image signals performed in the image display terminal having received the image signals.

2. Description of the Prior Art

In medical fields, various kinds of image forming modalities (i.e., image input apparatuses), such as computed tomography (CT) scanners, magnetic resonance imaging (MRI) apparatuses, and computed radiography (CR) apparatuses, have become popular as apparatuses for forming images to be used in making a diagnosis. Also, abnormal pattern detection processing systems (computer aided medical image diagnosing systems) have heretofore been proposed, wherein an abnormal pattern embedded in an image of an object represented by an image signal, which has been acquired with one of the image forming modalities, is detected automatically by the utilization of a computer and from the image signal. The abnormal pattern detection processing systems are described in, for example, Japanese Unexamined Patent Publication Nos. 8(1996)-294479 and 8(1996)-287230.

The proposed abnormal pattern detection processing systems primarily aim at detecting an abnormal pattern (i.e., a tumor pattern, a small calcified pattern, or the like), which suggests the presence of breast cancer, or the like, from a mamma image. As abnormal pattern detecting means for automatically performing processing for detecting an abnormal pattern, the abnormal pattern detection processing systems are provided with abnormal pattern detecting means utilizing an iris filter, wherein image density gradients (or luminance gradients) in an image are represented by image density gradient vectors, and an image area, which is associated with a high degree of centralization of the image density gradient vectors, is detected as an abnormal pattern. Alternatively, the abnormal pattern detection processing systems are provided with abnormal pattern detecting means utilizing a morphology filter, wherein a multi-structure element in accordance with the size of an abnormal pattern to be detected is utilized, and an image area, at which the image density changes in a range spatially narrower than the multi-structure element, is detected as an abnormal pattern. With the abnormal pattern detecting means utilizing the iris filter, a tumor pattern (a form of the abnormal pattern), which is a form of breast cancer, or the like, can be detected automatically. With the abnormal pattern detecting means utilizing the morphology filter, a small calcified pattern (a form of the abnormal pattern), which is a different form of breast cancer, or the like, can be detected automatically.

In the abnormal pattern detection processing systems, when an image signal representing an image (i.e., an original image, such as a mamma image) to be subjected to abnormal pattern detection processing, is received, the abnormal pattern detecting means described above detects an abnormal pattern, and region-of-interest setting means sets a local area limited region, which contains the detected abnormal pattern and a neighboring region, as a region of interest (hereinbelow referred to as the ROI). Also, local area limited image processing means performs specified image processing, such as enhancement processing in accordance with an attribute of the detected abnormal pattern (i.e., whether the detected abnormal pattern is a tumor pattern or a small calcified pattern), on the ROI image. Further, entire area image processing means performs predetermined image processing on an entire area image representing the original image, such that a visible image may be obtained, which has good image quality and can serve as an effective tool in, particularly, the efficient and accurate diagnosis of an illness. Furthermore, layout image forming means forms a single layout image from the entire area image, which has been obtained from the predetermined image processing, and the ROI image, which has been obtained from the specified image processing, and in accordance with a layout having been set previously. An image signal (hereinbelow referred to as the layout image signal) representing the layout image is fed into an image display terminal, such as a cathode ray tube (CRT) display device, or an image printing terminal, such as a laser printer (LP).

FIG. 9 is an explanatory view showing an example of a layout of an entire area image and a region-of-interest image displayed on an image display terminal. Specifically, in the cases of the mammography, for example, as illustrated in FIG. 9, an entire area image P of the right mamma of a patient and an ROI image W, which contains an abnormal pattern P1 having been detected and a neighboring region P2, may be superposed each other and displayed on the right half of a display screen of a CRT display device 300. Also, an entire area image P' of the left mamma of the patient, from which no abnormal pattern has been detected, may be displayed on the right half of the display screen. A signal representing an layout image L, which has been laid out in this manner, is fed into the CRT display device 300.

However, it is demanded that radiation images, and the like, given to medical doctors for making diagnoses can be formed so as to conform to preference of the respective medical doctors. The preference is based upon a difference in habit and experience between medical doctors, who see the radiation images. The demand is strong with respect to, particularly, a layout of a reproduced image, image processing conditions, and the like.

However, layout image signals, which are fed from the abnormal pattern detection processing systems described above into CRT terminals, and the like, are the fixed image signals having been processed in accordance with a layout, image processing conditions, and the like, which have been set previously. Therefore, on the side of a CRT terminal, which is operated by a medical doctor in a consultation room, it is impossible to perform new image processing by taking out only the image signal components, which represent the ROI image, from the given image signal, and to alter the layout of the ROI image with respect to the entire area image in various ways.

SUMMARY OF THE INVENTION

The primary object of the present invention is to provide an abnormal pattern detection processing method wherein, in cases where an image signal output destination is an image display terminal, alteration of an image displaying layout and image processing on each image (an entire area image or an ROI image) are capable of being performed freely at the image display terminal into which the image signal is fed out.

Another object of the present invention is to provide a system for carrying out the abnormal pattern detection processing method.

A further object of the present invention is to provide an image display terminal, wherein a layout and image processing of an image, which is represented by an image signal having been received from the abnormal pattern detection processing system, are capable of being altered arbitrarily.

An abnormal pattern detection processing method and system in accordance with the present invention are characterized by, in cases where an output destination is an image display terminal, feeding out an image signal, which represents an ROI image containing an abnormal pattern having been detected by abnormal pattern detecting means, and an image signal, which represents an entire area image, or an image signal, which represents an embedding entire area image, respectively as components into the image display terminal, such that the ROI image and the entire area image or the embedding entire area image are capable of being subjected to desired image processing on the side of the image display terminal at the output destination and displayed in an arbitrary layout on the image display terminal.

Specifically, the present invention provides a first abnormal pattern detection processing method, comprising the steps of:

i) performing abnormal pattern detection processing on a received entire area image signal, which represents an entire area image, an abnormal pattern embedded in the entire area image being thereby detected, ii) setting a local area limited region, which is constituted of the detected abnormal pattern and a region neighboring with the abnormal pattern, as a region-of-interest image, and iii) feeding information defined in one of (1), (2), (3), and (4) into an external image display terminal:

(1) the entire area image signal and a detection result signal, which represents detection results of the abnormal pattern having been detected, (2) the entire area image signal, the detection result signal, and a region-of-interest image signal, which represents the region-of-interest image, (3) an embedding entire area image signal representing an embedding entire area image, which is formed by embedding. the detection results of the abnormal pattern into the entire area image, and (4) the embedding entire area image signal and the region-of-interest image signal.

The term "abnormal pattern detection processing" as used herein means the processing for automatically detecting an abnormal pattern, which suggests the presence of breast cancer, or the like, from a mamma image, a chest image, or the like. Such processing is disclosed in, for example, Japanese Unexamined Patent Publication Nos. 8(1996)-294479 and 8(1996)-287230. By way of example, the abnormal pattern detection processing may be the processing utilizing an iris filter, wherein an image area, which is associated with a high degree of centralization of image density gradient vectors, is detected as an abnormal pattern. Alternatively, the abnormal pattern detection processing may be the processing utilizing a morphology filter, wherein an image area, at which the image density changes in a range spatially narrower than a multi-structure element, is detected as an abnormal pattern.

The term "received entire area image signal" as used herein means the image signal, which represents an entire object image and which is received from an image input apparatus. Examples of the image input apparatuses include various kinds of image forming modalities (such as CT scanners, MRI apparatuses, and CR apparatuses), and memories storing image signals. The image input apparatus may be connected via a network, such as a medical image network.

With the setting of the region-of-interest image, the region neighboring with the detected abnormal pattern is set such that the local area limited region may have, for example, a rectangular shape or a circular shape.

The term "detection result signal representing detection results of an abnormal pattern" as used herein means a signal representing, for example, the number of abnormal patterns (i.e., the number of the set ROI images), the position of the detected abnormal pattern (or coordinates of the position), the attribute of the abnormal pattern (i.e., whether the abnormal pattern is a tumor pattern or a small calcified pattern), and the like. Therefore, the term "embedding entire area image formed by embedding detection results of an abnormal pattern into an entire area image" as used herein means the image formed by embedding the information, which represents the position of the detected abnormal pattern, and the like, into the entire area image and thereby forming a new entire area image. The embedding entire area image may be formed in the step of the abnormal pattern detection processing, in the step of the setting of the region-of-interest image, or in the step of the feeding of the information into the image display terminal. Alternatively, the embedding entire area image may be formed in an additional step for forming the embedding entire area image.

The term "image display terminal" as used herein means a terminal equipment having functions for reproducing and displaying images and provided with processing functions of a level such that image processing, such as enhancement processing or smoothing processing, can be performed on a received image signal and the layout setting or alteration can be performed.

The first abnormal pattern detection processing method in accordance with the present invention may be modified such that the method further comprises the step of forming a layout image, in which (a) the entire area image or the embedding entire area image and (b) the region-of-interest image are laid out in a predetermined layout, and a layout image signal, which represents the layout image having been formed, is fed into the external image display terminal together with the information to be fed into the external image display terminal (i.e., the information defined in one of (1), (2), (3), and (4) described above).

The term "layout image" as used herein means the image obtained by, for example, as illustrated in FIG. 9, laying out (a) the entire area image or the embedding entire area image and (b) the region-of-interest image in accordance with the predetermined layout. The predetermined layout may be set previously. Alternatively, the predetermined layout may be set in accordance with the number of detected abnormal patterns, or the like, or in accordance with a request made from the external.

The image layout may take one of various known forms, such as those disclosed in Japanese Unexamined Patent Publication No. 8(1996)-294479. For example, the entire area image or the embedding entire area image, and the ROI image may be reproduced and displayed as independent images in a multi-window form on a single display screen. Alternatively, the entire area image or the embedding entire area image, and the region-of-interest image may be superposed one upon the other and displayed in this form in a single window. As another alternative, a plurality of images (e.g., right and left mamma images), which are to be grouped into a single set, may also be displayed in a multi-window form on a single display screen (or reproduced in such a manner on a single output medium).

In lieu of the step of forming the layout image being utilized, the first abnormal pattern detection processing method in accordance with the present invention may be modified such that the method further comprises the step of setting layout conditions for forming a predetermined layout image from (a) the entire area image or the embedding entire area image and (b) the region-of-interest image, and in cases where the information defined in either one of (2) and (4) is to be fed into the external image display terminal, a layout condition signal representing the layout conditions, which have been set, is fed together with the information defined in either one of (2) and (4) into the image display terminal.

In cases where the layout condition signal, the entire area image signal or the embedding entire area image signal, and the region-of-interest image signal are fed into the image display terminal, the layout image can be formed on the side of the image display terminal.

In cases where the reproduced layout image is not a satisfactory one, the layout conditions can be set freely on the side of the image display terminal by making reference to the previously set layout conditions, and a layout image of a desired layout can thereby be reproduced.

The term "layout conditions" as used herein means the information, which represents parameters, and the like, and which defines the layout of the entire area image or the embedding entire area image, and the region-of-interest image.

The first abnormal pattern detection processing method in accordance with the present invention may also be modified such that the method further comprises the steps of: performing first image processing on the entire area image signal or the embedding entire area image signal, and performing second image processing on the region-of-interest image signal, the entire area image signal, which is to be fed into the external image display terminal, is an entire area image signal having been obtained from the first image processing, or the embedding entire area image signal, which is to be fed into the external image display terminal, is an embedding entire area image signal having been obtained from the first image processing, and the region-of-interest image signal, which is to be fed into the external image display terminal, is a region-of-interest image signal having been obtained from the second image processing.

In cases where the layout image signal is contained in the information to be fed into the image display terminal, the entire area image or the embedding entire area image in the layout image, which is represented by the layout image signal, may be the one having been obtained from the first image processing, and the region-of-interest image in the layout image may be the one having been obtained from the second image processing.

The term "first image processing" as used herein means the image processing appropriate for enhancing the image quality of the entire area image or the embedding entire area image. The term "second image processing" as used herein means the image processing appropriate for enhancing the image quality of the region-of-interest image. The second image processing should preferably be set in accordance with the attribute of the detected abnormal pattern, i.e. whether the abnormal pattern is a tumor pattern or a small calcified pattern. Also, the second image processing should preferably contain image size enlargement or reduction processing.

Further, in lieu of the steps of performing the first image processing and the second image processing being utilized, or in addition to these steps, the first abnormal pattern detection processing method may be modified such that the method further comprises the steps of: setting processing conditions for first image processing, which is to be performed on the entire area image signal or the embedding entire area image signal, and setting processing conditions for second image processing, which is to be performed on the region-of-interest image signal, and a signal representing the processing conditions for the first image processing, which have been set, and a signal representing the processing conditions for the second image processing, which have been set, are fed into the external image display terminal together with the information to be fed into the external image display terminal.

In cases where the signal representing the image processing conditions is fed into the image display terminal, the image processing can be performed in accordance with the image processing conditions on the side of the image display terminal. Also, in cases where the image obtained from the image processing is not a satisfactory one, the image processing can be altered freely on the side of the image display terminal by making reference to the image processing conditions, and an image having desired image quality can thereby be reproduced.

The image signal representing an object image to be subjected to the abnormal pattern detection processing may be a mamma image signal. Ordinarily, in the cases of the mammography, a single plan (or frontal) image and a single lateral image are recorded with respect to each of the right and left mammae, and the four recorded images are grouped into a single set. Therefore, there is a strong demand for a specific layout on the side of the image display terminal, and the abnormal pattern detection processing method in accordance with the present invention is particularly effective for such cases.

The foregoing explanation of the first abnormal pattern detection processing method in accordance with the present invention is also applied to a second abnormal pattern detection processing method in accordance with the present invention, which will be described below.

A second abnormal pattern detection processing method in accordance with the present invention is characterized by altering the details of the information, which is fed to an image signal output destination, in accordance with whether the image signal output destination is an image display terminal or an image printing terminal. In cases where the output destination is the image display terminal, the same operation as that in the aforesaid first abnormal pattern detection processing method in accordance with the present invention is performed.

Specifically, the present invention also provides a second abnormal pattern detection processing method, comprising the steps of:

i) performing abnormal pattern detection processing on a received entire area image signal, which represents an entire area image, an abnormal pattern embedded in the entire area image being thereby detected, ii) setting a local area limited region, which is constituted of the detected abnormal pattern and a region neighboring with the abnormal pattern, as a region-of-interest image, iii) detecting a kind of an external output destination, iv) in cases where the detected output destination is an image display terminal, feeding information defined in one of (1), (2), (3), and (4) above into the image display terminal, and v) in cases where the detected output destination is an image printing terminal, feeding information defined in either one of (3) and (4) above into the image printing terminal.

The term "image printing terminal" as used herein means the device, such as a laser printer, for fixing and reproducing an image on film or other media.

The second abnormal pattern detection processing method in accordance with the present invention may be modified such that the method further comprises the step of forming a layout image, in which (a) the entire area image or the embedding entire area image and (b) the region-of-interest image are laid out in a predetermined layout, and a layout image signal, which represents the layout image having been formed, is fed into either one of the external image display terminal and the external image printing terminal together with the information to be fed into the either one of the external image display terminal and the image printing terminal.

In lieu of the step of forming the layout image being utilized, the second abnormal pattern detection processing method in accordance with the present invention may be modified such that the method further comprises the step of setting layout conditions for forming a predetermined layout image from (a) the entire area image or the embedding entire area image and (b) the region-of-interest image, and in cases where the detected output destination is the image display terminal and the information defined in either one of (2) and (4) is to be fed into the image display terminal, a layout condition signal representing the layout conditions, which have been set, is fed together with the information defined in either one of (2) and (4) into the image display terminal.

In cases where the layout condition signal representing the layout conditions, the entire area image signal or the embedding entire area image signal, and the region-of-interest image signal are fed into the image display terminal, the layout image can be formed on the side of the image display terminal. The image printing terminal by itself cannot set a layout. Therefore, in cases where the output destination is the image printing terminal, it is unnecessary for the layout condition signal representing the layout conditions to be fed into the image printing terminal.

In cases where the output destination is the image display terminal and the reproduced layout image is not a satisfactory one, the layout conditions can be set freely on the side of the image display terminal by making reference to the previously set layout conditions, and a layout image of a desired layout can thereby be reproduced.

The term "layout conditions" as used herein has the same meaning as that described above with reference to the first abnormal pattern detection processing method in accordance with the present invention.

The second abnormal pattern detection processing method in accordance with the present invention may also be modified such that the method further comprises the steps of: performing first image processing on the entire area image signal or the embedding entire area image signal, and performing second image processing on the region-of-interest image signal, the entire area image signal, which is to be fed into the output destination, is an entire area image signal having been obtained from the first image processing, or the embedding entire area image signal, which is to be fed into the output destination, is an embedding entire area image signal having been obtained from the first image processing, and the region-of-interest image signal, which is to be fed into the output destination, is a region-of-interest image signal having been obtained from the second image processing.

In cases where the layout image signal is contained in the information to be fed into the output destination, the entire area image or the embedding entire area image in the layout image, which is represented by the layout image signal, may be the one having been obtained from the first image processing, and the region-of-interest image in the layout image may be the one having been obtained from the second image processing.

Further, in lieu of the steps of performing the first image processing and the second image processing being utilized, or in addition to these steps, the second abnormal pattern detection processing method may be modified such that the method further comprises the steps of: setting processing conditions for first image processing, which is to be performed on the entire area image signal or the embedding entire area image signal, and setting processing conditions for second image processing, which is to be performed on the region-of-interest image signal, and in cases where the detected output destination is the image display terminal, a signal representing the processing conditions for the first image processing, which have been set, and a signal representing the processing conditions for the second image processing, which have been set, are fed into the image display terminal together with the information to be fed into the image display terminal.

In cases where the signals representing the image processing conditions are fed into the image display terminal, the image processing can be performed in accordance with the image processing conditions on the side of the image display terminal. Also, in cases where the image obtained from the image processing is not a satisfactory one, the image processing can be altered freely on the side of the image display terminal by making reference to the image processing conditions, and an image having desired image quality can thereby be reproduced. The image printing terminal by itself cannot perform image processing. Therefore, in cases where the output destination is the image printing terminal, it is unnecessary for the signals representing the image processing conditions to be fed into the image printing terminal.

The image signal representing an object image to be subjected to the abnormal pattern detection processing may be a mamma image signal. Ordinarily, in the cases of the mammography, a single plan (or frontal) image and a single lateral image are recorded with respect to each of the right and left mammae, and the four recorded images are grouped into a single set. Therefore, there is a strong demand for a specific layout on the side of the image display terminal, and the abnormal pattern detection processing method in accordance with the present invention is particularly effective for such cases.

In the first and second abnormal pattern detection processing methods in accordance with the present invention, before the aforesaid information, such as the image signal, is fed into the predetermined output destination, the information to be fed into the output destination may be filed in the output format in a memory, other storage media, or the like.

The present invention further provides a first system for carrying out the first abnormal pattern detection processing method in accordance with the present invention. Specifically, the present invention further provides a first abnormal pattern detection processing system, comprising:

i) abnormal pattern detecting means for performing abnormal pattern detection processing on a received entire area image signal, which represents an entire area image, and thereby detecting an abnormal pattern embedded in the entire area image, ii) region-of-interest setting means for setting a local area limited region, which is constituted of the detected abnormal pattern and a region neighboring with the abnormal pattern, as a region-of-interest image, and iii) output means for feeding information defined in one of (1), (2), (3), and (4) into an external image display terminal:

(1) the entire area image signal and a detection result signal, which represents detection results of the abnormal pattern having been detected, (2) the entire area image signal, the detection result signal, and a region-of-interest image signal, which represents the region-of-interest image, (3) an embedding entire area image signal representing an embedding entire area image, which is formed by embedding the detection results of the abnormal pattern into the entire area image, and (4) the embedding entire area image signal and the region-of-interest image signal.

The term "abnormal pattern detecting means" as used herein means the means for automatically detecting an abnormal pattern, which suggests the presence of breast cancer, or the like, from a mamma image, a chest image, or the like. By way of example, the abnormal pattern detecting means may be the means utilizing an iris filter, wherein an image area, which is associated with a high degree of centralization of image density gradient vectors, is detected as an abnormal pattern. Alternatively, the abnormal pattern detecting means may be the means utilizing a morphology filter, wherein an image area, at which the image density changes in a range spatially narrower than a multi-structure element, is detected as an abnormal pattern.

The region-of-interest setting means sets the region neighboring with the detected abnormal pattern such that the local area limited region may have, for example, a rectangular shape or a circular shape.

The embedding entire area image may be formed by the abnormal pattern detecting means, the region-of-interest setting means, or the output means. Alternatively, the system may further comprise embedding image forming means, and the embedding entire area image may be formed by the embedding image forming means.

The first abnormal pattern detection processing system in accordance with the present invention may be modified such that the system further comprises layout image forming means for forming a layout image, in which (a) the entire area image or the embedding entire area image and (b) the region-of-interest image are laid out in a predetermined layout, and the output means feeds a layout image signal, which represents the layout image having been formed by the layout image forming means, into the external image display terminal together with the information to be fed into the external image display terminal.

In lieu of the layout image forming means being provided, the first abnormal pattern detection processing system in accordance with the present invention may be modified such that the system further comprises layout condition setting means for forming a predetermined layout image from (a) the entire area image or the embedding entire area image and (b) the region-of-interest image, and in cases where the information defined in either one of (2) and (4) is to be fed into the external image display terminal, the output means feeds a layout condition signal representing the layout conditions, which have been set by the layout condition setting means, together with the information defined in either one of (2) and (4) into the image display terminal.

The first abnormal pattern detection processing system in accordance with the present invention may also be modified such that the system further comprises: first image processing means for performing first image processing on the entire area image signal or the embedding entire area image signal, and second image processing means for performing second image processing on the region-of-interest image signal, the entire area image signal, which is to be fed from the output means into the external image display terminal, is an entire area image signal having been obtained from the first image processing, or the embedding entire area image signal, which is to be fed from the output means into the external image display terminal, is an embedding entire area image signal having been obtained from the first image processing, and the region-of-interest image signal, which is to be fed from the output means into the external image display terminal, is a region-of-interest image signal having been obtained from the second image processing.

In cases where the layout image signal is contained in the information to be fed from the output means into the image display terminal, the entire area image or the embedding entire area image in the layout image, which is represented by the layout image signal, may be the one having been obtained from the first image processing, and the region-of-interest image in the layout image may be the one having been obtained from the second image processing.

Further, in lieu of the first image processing means and the second image processing means being provided, or in addition to them, the first abnormal pattern detection processing system may be modified such that the system further comprises image processing condition setting means for setting processing conditions for first image processing, which is to be performed on the entire area image signal or the embedding entire area image signal, and setting processing conditions for second image processing, which is to be performed on the region-of-interest image signal, and the output means feeds a signal representing the processing conditions for the first image processing, which have been set by the image processing condition setting means, and a signal representing the processing conditions for the second image processing, which have been set by the image processing condition setting means, into the external image display terminal together with the information to be fed into the external image display terminal.

The present invention still further provides a system for carrying out the second abnormal pattern detection processing method in accordance with the present invention. Specifically, the present invention still further provides a second abnormal pattern detection processing system, comprising:

i) abnormal pattern detecting means for performing abnormal pattern detection processing on a received entire area image signal, which represents an entire area image, and thereby detecting an abnormal pattern embedded in the entire area image, ii) region-of-interest setting means for setting a local area limited region, which is constituted of the detected abnormal pattern and a region neighboring with the abnormal pattern, as a region-of-interest image, iii) output destination kind detecting means for detecting a kind of an external output destination, and iv) output means for operating such that, in cases where the detected output destination is an image display terminal, the output means feeds information defined in one of (1), (2), (3), and (4) above into the image display terminal, and such that, in cases where the detected output destination is an image printing terminal, the output means feeds information defined in either one of (3) and (4) above into the image printing terminal.

The second abnormal pattern detection processing system in accordance with the present invention may be modified such that the system further comprises layout image forming means for forming a layout image, in which (a) the entire area image or the embedding entire area image and (b) the region-of-interest image are laid out in a predetermined layout, and the output means feeds a layout image signal, which represents the layout image having been formed by the layout image forming means, into either one of the external image display terminal and the external image printing terminal together with the information to be fed into the either one of the external image display terminal and the image printing terminal.

In lieu of the layout image forming means being provided, the second abnormal pattern detection processing system in accordance with the present invention may be modified such that the system further comprises layout condition setting means for setting layout conditions for forming a predetermined layout image from (a) the entire area image or the embedding entire area image and (b) the region-of-interest image, and in cases where the detected output destination is the image display terminal and the information defined in either one of (2) and (4) is to be fed from the output means into the image display terminal, the output means feeds a layout condition signal representing the layout conditions, which have been set by the layout condition setting means, together with the information defined in either one of (2) and (4) into the image display terminal.

The second abnormal pattern detection processing system in accordance with the present invention may also be modified such that the system further comprises first image processing means for performing first image processing on the entire area image signal or the embedding entire area image signal, and second image processing means for performing second image processing on the region-of-interest image signal, the entire area image signal, which is to be fed from the output means into the output destination, is an entire area image signal having been obtained from the first image processing, or the embedding entire area image signal, which is to be fed from the output means into the output destination, is an embedding entire area image signal having been obtained from the first image processing, and the region-of-interest image signal, which is to be fed from the output means into the output destination, is a region-of-interest image signal having been obtained from the second image processing.

In cases where the layout image signal is contained in the information to be fed from the output means into the output destination, the entire area image or the embedding entire area image in the layout image, which is represented by the layout image signal, may be the one having been obtained from the first image processing, and the region-of-interest image in the layout image may be the one having been obtained from the second image processing.

Further, in lieu of the first image processing means and the second image processing means being provided, or in addition to them, the second abnormal pattern detection processing system may be modified such that the system further comprises image processing condition setting means for setting processing conditions for first image processing, which is to be performed on the entire area image signal or the embedding entire area image signal, and setting processing conditions for second image processing, which is to be performed on the region-of-interest image signal, and in cases where the detected output destination is the image display terminal, the output means feeds a signal representing the processing conditions for the first image processing, which have been set by the image processing condition setting means, and a signal representing the processing conditions for the second image processing, which have been set by the image processing condition setting means, into the image display terminal together with the information to be fed into the image display terminal.

In the first and second abnormal pattern detection processing systems in accordance with the present invention, before the aforesaid information, such as the image signal, is fed from the output means into the predetermined output destination, the information to be fed into the output destination may be filed in the output format in a memory, other storage media, or the like. For such purposes, the system may be provided with storage means.

The present invention also provides an image display terminal for reproducing a visible image from the information, which has been received from one of the aforesaid abnormal pattern detection processing systems in accordance with the present invention, and displaying the visible image, comprising:

i) layout image forming means for forming a layout image by laying out:

(a) the entire area image, which is represented by the entire area image signal received from the abnormal pattern detection processing system, or the embedding entire area image, which is represented by the embedding entire area image signal received from the abnormal pattern detection processing system, and (b) the region-of-interest image, which is represented by the region-of-interest image signal received from the abnormal pattern detection processing system, in a predetermined layout, or for forming a layout image in accordance with a layout condition signal representing layout conditions, which is received from the abnormal pattern detection processing system, and ii) means for displaying the layout image, which has been formed by the layout image forming means.

With the image display terminal in accordance with the present invention, the layout image can be formed freely in accordance with the received information. Also, in cases where the layout image is to be formed in accordance with the received layout conditions, a processing load for calculations of layout conditions can be kept light.

The image display terminal in accordance with the present invention may be modified such that the image display terminal further comprises image processing means for performing image processing on the information, which has been received from the abnormal pattern detection processing system, and in accordance with desired image processing conditions, or for performing:

first image processing on the entire area image signal or the embedding entire area image signal and in accordance with processing conditions for the first image processing, which have been received from the abnormal pattern detection processing system, and second image processing on the region-of-interest image signal and in accordance with processing conditions for the second image processing, which have been received from the abnormal pattern detection processing system. With the image display terminal having such a constitution in accordance with the present invention, the image processing can be performed freely in accordance with the received information. Also, in cases where the image processing is to be performed in accordance with the received processing conditions, a processing load for calculations of processing conditions can be kept light.

With the abnormal pattern detection processing methods and systems in accordance with the present invention, in cases where the output destination is the image display terminal, the image signal, which represents the ROI image containing an abnormal pattern, and the entire area image signal or the embedding entire area image signal image signal representing the embedding entire area image, which is formed by embedding the detection results of the abnormal pattern into the entire area image, are fed respectively as components into the image display terminal. Therefore, the person (primarily a medical doctor), who sees a visible image on the image display terminal at the output destination, can perform image processing, which is appropriate for the image reading aptitude, on the ROI image, and the entire area image or the embedding entire area image, in accordance with the received information, and can display the images in a desired layout. As a result, a visible image can be obtained, which has good image quality and can serve as an effective tool in, particularly the efficient and accurate diagnosis of an illness. Also, in cases where the person, who sees a visible image, does not understand the image reading aptitude, alteration of the image processing and the layout can be iterated at the image display terminal and in accordance with the ROI image signal, the entire area image signal, and the detection result signal. Therefore, the image processing and/or the layout setting can be performed through trial and error, and the image processing and the layout appropriate for the image reading aptitude of the person, who sees the visible image, can be found.

With the second abnormal pattern detection processing method and system in accordance with the present invention, in cases where the output destination is the image printing terminal, at which it is not expected to perform trial-and-error image reproduction wasting media, such as film, the image signal representing the layout image, which has been formed with the image processing and the layout having been set in the abnormal pattern detection processing system, is fed into the image printing terminal. Therefore, waste of media can be prevented.

With the image display terminal in accordance with the present invention, the layout image can be formed freely in accordance with the received information. Also, in cases where the layout image is to be formed in accordance with the received layout conditions, a processing load for calculations of layout conditions can be kept light.

DESCRIPTION OF THE PREFERRED EMBODIMENTS

The present invention will hereinbelow be described in further detail with reference to the accompanying drawings.

Figure 1:
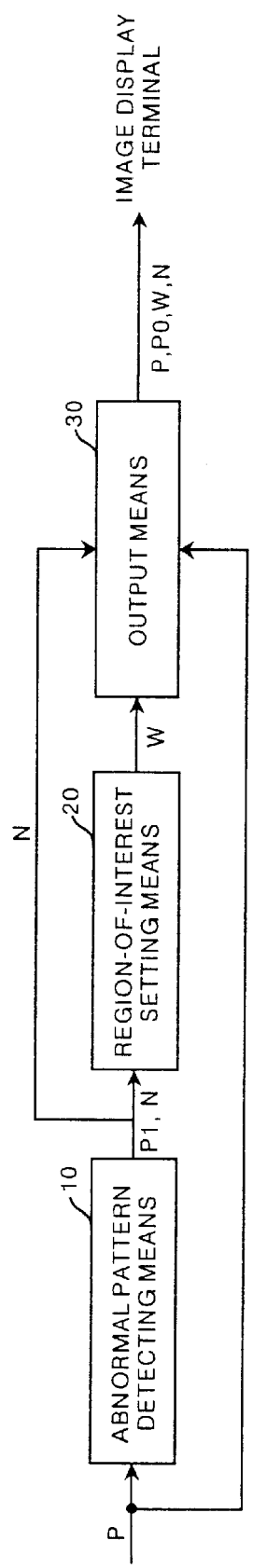
FIG. 1 is a block diagram showing a first embodiment of the first abnormal pattern detection processing system in accordance with the present invention.

FIG. 1 is a block diagram showing a first embodiment of the first abnormal pattern detection processing system in accordance with the present invention. With reference to FIG. 1, an abnormal pattern detection processing system receives an image signal representing a mamma image P of a patient and feeds an image signal, and the like, into an external image display terminal (a CRT display terminal). The abnormal pattern detection processing system comprises abnormal pattern detecting means 10 for performing abnormal pattern detection processing on a received entire area image signal P, which represents an entire area image P of the mamma, and thereby detecting an abnormal pattern P1 embedded in the entire area image P. (As an aid in facilitating the explanation, an image and an image signal representing the image are herein represented by the same reference character.) The abnormal pattern detection processing system also comprises region-of-interest setting means 20 for setting a rectangular local area limited region, which is constituted of the abnormal pattern P1 having been detected by the abnormal pattern detecting means 10 and a region P2 neighboring with the abnormal pattern P1, as a region-of-interest image W. The abnormal pattern detection processing system further comprises output means 30 for feeding information defined in one of (1), (2), (3), and (4) into an external image display terminal:

(1) the entire area image signal P and a detection result signal N, which represents detection results of the abnormal pattern P1 having been detected by the abnormal pattern detecting means 10, (the detection result signal N representing, e.g., the number of abnormal patterns (in this embodiment, one), the position of the detected abnormal pattern, the attribute of the abnormal pattern (i.e., whether the abnormal pattern is a tumor pattern or a small calcified pattern), and the like), (2) the entire area image signal P, the detection result signal N, and a region-of-interest image signal W, which represents the region-of-interest image W, (3) an embedding entire area image signal P0 representing an embedding entire area image P0, which is formed by embedding the detection results N of the abnormal pattern into the entire area image P, and (4) the embedding entire area image signal P0 and the region-of-interest image signal W.

The abnormal pattern detecting means 10 stores an algorithm for abnormal pattern detection processing utilizing an iris filter, wherein an image area, which is associated with a high degree of centralization of image density gradient vectors, is detected as an abnormal pattern. The abnormal pattern detecting means 10 also stores an algorithm for abnormal pattern detection processing utilizing a morphology filter, wherein an image area, at which the image density changes in a range spatially narrower than a multi-structure element, is detected as an abnormal pattern. The abnormal pattern detecting means 10 detects the shape range, the position, and the number of the abnormal pattern by utilizing each algorithm. The attribute of the abnormal pattern capable of being detected varies for different algorithms. Therefore, the attribute of the abnormal pattern is determined by whether the abnormal pattern was detected with the algorithm utilizing the iris filter or with the algorithm utilizing the morphology filter.

How the first embodiment of the first abnormal pattern detection processing system in accordance with the present invention operates will be described hereinbelow.

Firstly, the entire area image signal P representing the mamma image is fed from an external image forming modality into the abnormal pattern detecting means 10 and the output means 30 of the abnormal pattern detection processing system. The abnormal pattern detecting means 10 performs the abnormal pattern detection processing with the aforesaid algorithms on the received entire area image signal P, and detects the abnormal pattern P1 embedded in the mamma image. With the abnormal pattern detection processing, the shape range, the position, and the number of the abnormal pattern are detected. The region surrounded by the shape range of the abnormal pattern is detected as the abnormal pattern P1. The signal representing the abnormal pattern P1 is outputted from the abnormal pattern detecting means 10 together with the detection result signal N, which is constituted of information representing the position, the number, and the attribute of the abnormal pattern P1.

The abnormal pattern signal P1 and the detection result signal N, which have been obtained from the abnormal pattern detecting means 10, are fed into the region-of-interest setting means 20. The detection result signal N is also fed into the output means 30.

In accordance with the abnormal pattern signal P1 and the detection result signal N having been received, the region-of-interest setting means 20 sets the rectangular local area limited region, which contains the abnormal pattern P1, as the region-of-interest image W. In cases where a plurality of abnormal patterns have been detected, a plurality of region-of-interest images W, W, . . . are set. The region-of-interest setting means 20 feeds the image signal (the region-of-interest image signal) W, which represents the region-of-interest image W having been set, into the output means 30.

The output means 30, into which the region-of-interest image signal W is fed, has already received the entire area image signal P and the detection result signal N, which served as the basis of the setting of the region-of-interest image signal W. The output means 30 forms the embedding entire area image signal P0 in accordance with the entire area image signal P and the detection result signal N having been received. Also, the output means 30 feeds the information, which is defined in one of (1), (2), (3), and (4) described above, into the external image display terminal. The signals constituting the information, which is defined in one of (1), (2), (3), and (4) described above, are thus fed out as components (i.e., as separate signals).

Which information among the pieces of information defined in (1), (2), (3), and (4) is to be fed out may be fixedly set previously for each user of the abnormal pattern detection processing system, or may be selected in accordance with a request made from the external terminal, or the like.

In this embodiment, by way of example, the information defined in (2) above is fed into the image display terminal in accordance with a request made from the image display terminal. On the image display terminal at the output destination, the information defined in (2) and having been received from the abnormal pattern detection processing system is displayed. Specifically, the entire area image P, the detection results N of the abnormal pattern P1, and the region-of-interest image W are displayed on the image display terminal. The person, who sees the information displayed on the image display terminal, can perform image processing, which is appropriate for the image reading aptitude, on the region-of-interest image W and the entire area image P in accordance with the displayed information. Also, the person, who sees the information displayed on the image display terminal, can display the images in a desired layout.

As described above, with the first embodiment of the first abnormal pattern detection processing system in accordance with the present invention, only the final layout image having been formed with the system's own image processing and layout is not intruded upon the person, who sees the images at the external image display terminal, and the information is furnished in the format enabling the person, who sees the images at the external image display terminal, to perform the processing, which is appropriate for the reading of the abnormal pattern, through trial and error at the image display terminal. As a result, a visible image can be obtained, which has good image quality and can serve as an effective tool in, particularly the efficient and accurate diagnosis of an illness.

In the embodiment described above, the information defined in (2) above is fed into the image display terminal in accordance with a request made from the image display terminal. In cases where the information defined in (1), (3), or (4) is requested, the output means 30 feeds the requested information as components into the image display terminal. At the image display terminal, the person, who sees the images, can freely perform processing on the component information and can set the layout.

Also, in the first embodiment of the first abnormal pattern detection processing system in accordance with the present invention, the output means 30 feeds out the information defined in one of (1), (2), (3), and (4) above in accordance with the request made from the external image display terminal. Alternatively, the selection of the information defined in one of (1), (2), (3), and (4) may be set previously for each user.

Figure 2:
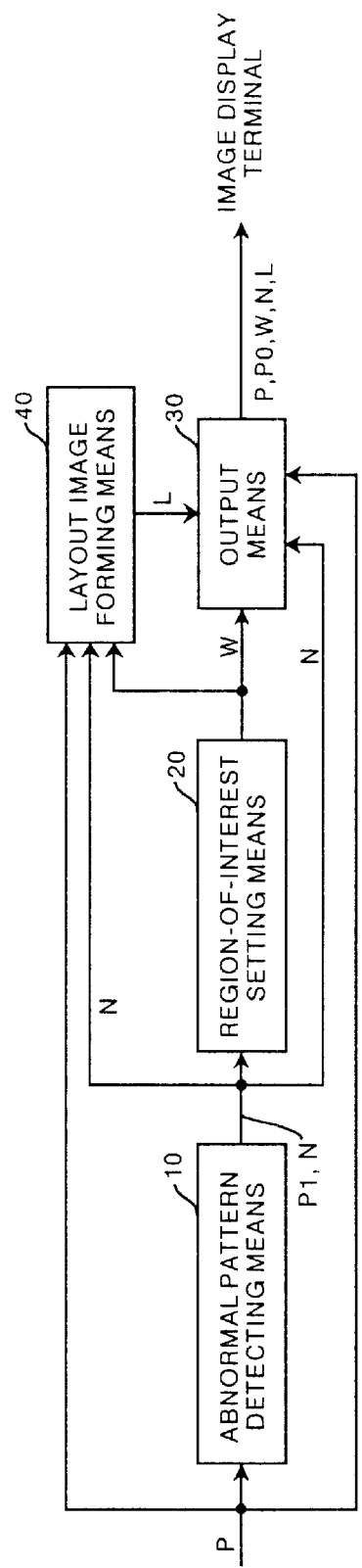
FIG. 2 is a block diagram showing a second embodiment of the first abnormal pattern detection processing system in accordance with the present invention.

FIG. 2 is a block diagram showing a second embodiment of the first abnormal pattern detection processing system in accordance with the present invention. The second embodiment of the first abnormal pattern detection processing system shown in FIG. 2 is constituted basically in the same manner as that in the first embodiment of the first abnormal pattern detection processing system shown in FIG. 1, except that the second embodiment of FIG. 2 further comprises layout image forming means 40. The layout image forming means 40 forms a layout image L, in which the entire area image P and the region-of-interest image W are laid out in a predetermined layout. The layout image forming means 40 also feeds a layout image signal L, which represents the layout image L, into the output means 30. Also, in the second embodiment, the output means 30 has the functions for feeding the received layout image signal L into the external image display terminal together with the information defined in one of (1), (2), (3), and (4), which is to be fed into the image display terminal.

As the predetermined layout, by way of example, a layout may be employed, in which the region-of-interest image W is located at a peripheral region of the entire area image P or the embedding entire area image P0. In cases where a plurality of abnormal patterns have been detected, a plurality of region-of-interest images W, W, . . . , which are set for the abnormal patterns, are located such that they may not overlap one upon another.

How the second embodiment of the first abnormal pattern detection processing system shown in FIG. 2 operates will be described hereinbelow.

Firstly, the entire area image signal P representing the mamma image is fed from an external image forming modality into the abnormal pattern detecting means 10, the layout image forming means 40, and the output means 30 of the abnormal pattern detection processing system. The abnormal pattern detecting means 10 performs the abnormal pattern detection processing on the received entire area image signal P, and detects the abnormal pattern P1 embedded in the mamma image. Also, the abnormal pattern detecting means 10 feeds the abnormal pattern signal P1 and the detection result signal N into the region-of-interest setting means 20. Of the abnormal pattern signal P1 and the detection result signal N having been obtained from the abnormal pattern detecting means 10, the detection result signal N is also fed into the layout image forming means 40 and the output means 30.

In accordance with the abnormal pattern signal P1 and the detection result signal N having been received, the region-of-interest setting means 20 sets the rectangular local area limited region, which contains the abnormal pattern P1, as the region-of-interest image W. The region-of-interest setting means 20 feeds the region-of-interest image signal W, which represents the region-of-interest image W having been set, into the layout image forming means 40 and the output means 30.

The layout image forming means 40 forms the layout image L, in which the entire area image P and the region-of-interest image W are laid out in the predetermined layout, in accordance with the entire area image signal P having been received directly from the exterior, the detection result signal N having been received from the abnormal pattern detecting means 10, and the region-of-interest image signal W having been received from the region-of-interest setting means 20. The layout image forming means 40 also feeds the layout image signal L, which represents the layout image L, into the output means 30.

In the manner described above, the output means 30 receives the entire area image signal P, the region-of-interest image signal W, the detection result signal N, and the layout image signal L. In the same manner as that in the first embodiment described above, the output means 30 forms the embedding entire area image signal P0 representing the embedding entire area image P0, in which the detection results N have been embedded into the entire area image P. Also, the output means 30 feeds the layout image signal L together with the information, which is defined in one of (1), (2), (3), and (4) described above, into the external image display terminal and in accordance with a request made from the external image display terminal or in accordance with previous setting. The layout image signal L and the signals constituting the information, which is defined in one of (1), (2), (3), and (4) described above, are thus fed out as components (i.e., as separate signals).

The layout image signal L, which represents the layout image L, is fed into the image display terminal at the output destination together with the information defined in one of (1), (2), (3), and,(4). The layout image L represented by the layout image signal L is displayed as a default image on the image display terminal. In cases where the layout of the displayed layout image L is not a satisfactory one, or in cases where specific image processing is to be performed, the person, who sees the images at the image display terminal, can display a different image or a different layout image in a specific layout on the image display terminal by utilizing other information and detection result signal received as components.

As described above, with the second embodiment of the first abnormal pattern detection processing system in accordance with the present invention, the information is furnished to the person, who sees the images at the external image display terminal, in the format enabling the person to perform the layout processing and the image processing, which are appropriate for the reading of the abnormal pattern, through trial and error at the image display terminal. As a result, a visible image can be obtained, which has good image quality and can serve as an effective tool in, particularly the efficient and accurate diagnosis of an illness.

Figure 3:
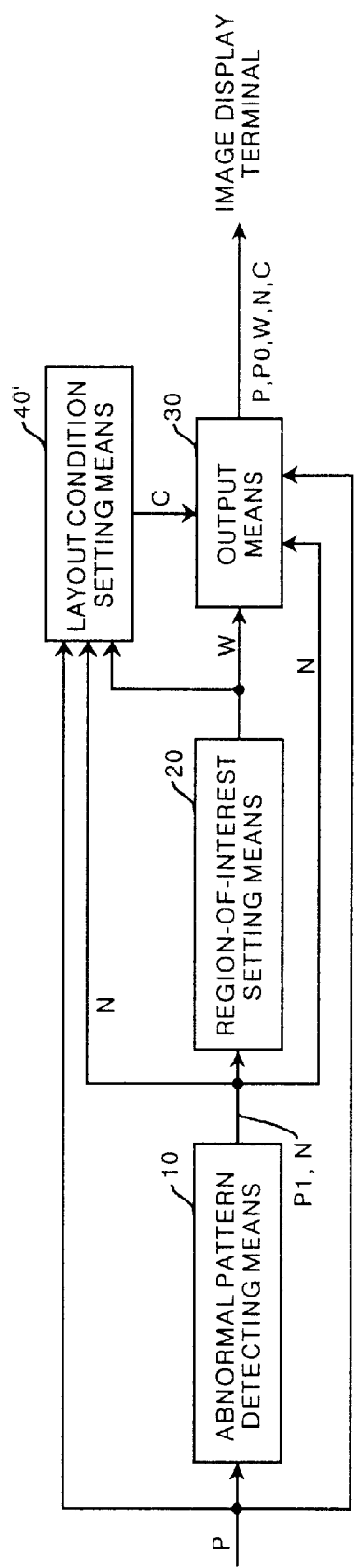
FIG. 3 is a block diagram showing a third embodiment of the first abnormal pattern detection processing system in accordance with the present invention.

FIG. 3 is a block diagram showing a third embodiment of the first abnormal pattern detection processing system in accordance with the present invention. The third embodiment of the first abnormal pattern detection processing system shown in FIG. 3 is constituted basically in the same manner as that in the second embodiment of FIG. 2, except that the layout image forming means 40 is replaced by layout condition setting means 40' for setting only the layout conditions (relationship of positions, and the like) C for the formation of the layout image signal L. Also, in the third embodiment of FIG. 3, instead of the layout image signal L being fed out from the output means 30, the output means 30 feeds out a layout condition signal C representing the layout conditions C, which have been set by the layout condition setting means 40'.

The layout conditions C are the conditions for the formation of the layout image signal L representing the layout image L of a recommended layout having been set as a default. The layout condition setting means 40' receives the entire area image signal P, the detection result signal N representing the detection results of the abnormal pattern, and the region-of-interest image signal W, and sets the layout conditions C. The layout condition signal C representing the layout conditions C having been set is fed into the output means 30. The output means 30 feeds the layout condition signal C into the external image display terminal together with the requested information defined in one of (1), (2), (3), and (4).

The layout condition signal C, which represents the layout conditions C, is fed from the output means 30 into the image display terminal at the output destination together with the information defined in one of (1), (2), (3), and (4). The person, who sees the images at the image display terminal, can form and display a layout image in accordance with the recommended layout conditions C and by utilizing the image signals and the detection result signal N having been received as components, or can form and display a layout image of a specific layout by making reference to the recommended layout conditions C.

As described above, with the third embodiment of the first abnormal pattern detection processing system in accordance with the present invention, the information is furnished to the person, who sees the images at the external image display terminal, in the format enabling the person to perform the layout processing and the image processing, which are appropriate for the reading of the abnormal pattern, through trial and error at the image display terminal. As a result, a visible image can be obtained, which has good image quality and can serve as an effective tool in, particularly the efficient and accurate diagnosis of an illness.

Figure 4:
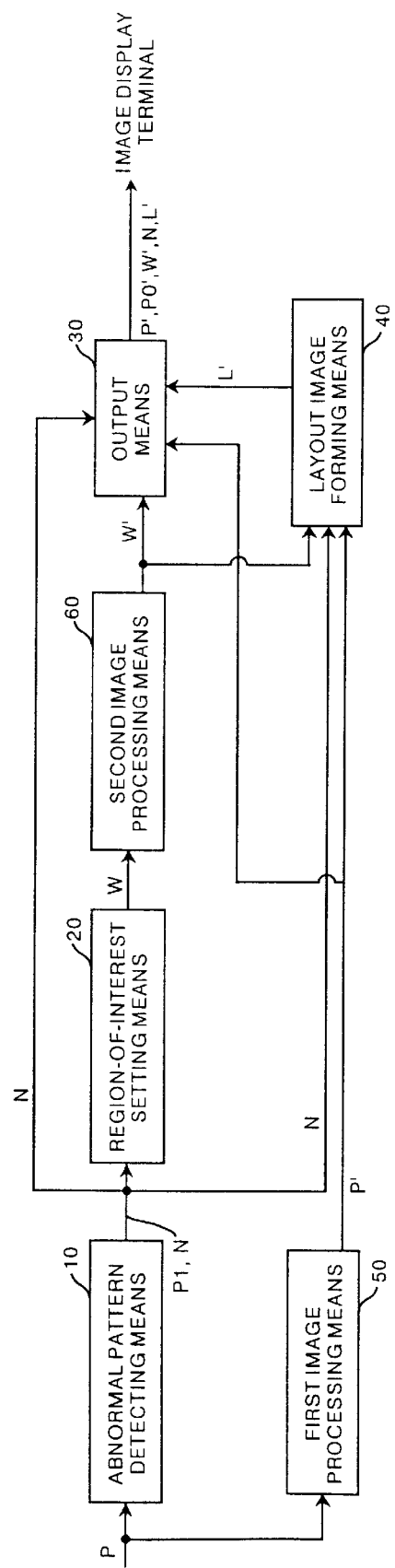
FIG. 4 is a block diagram showing a fourth embodiment of the first abnormal pattern detection processing system in accordance with the present invention.

FIG. 4 is a block diagram showing a fourth embodiment of the first abnormal pattern detection processing system in accordance with the present invention. The fourth embodiment of the first abnormal pattern detection processing system shown in FIG. 4 is constituted basically in the same manner as that in the second embodiment of FIG. 2, except that the fourth embodiment of FIG. 4 further comprises first image processing means 50 and second image processing means 60. The first image processing means 50 performs first image processing on the entire area image signal P and feeds an entire area image signal P', which has been obtained from the first image processing, into the layout image forming means 40 and the output means 30. The second image processing means 60 performs second image processing on the region-of-interest image signal W and feeds a region-of-interest image signal W', which has been obtained from the second image processing, into the layout image forming means 40 and the output means 30. The layout image forming means 40 forms the layout image from the entire area image signal P' having been obtained from the first image processing and the region-of-interest image signal W' having been obtained from the second image processing. The output means 30 has the functions for forming an embedding entire area image signal P0' representing an embedding entire area image P0', in which the detection results N have been embedded into the entire area image P' having been obtained from the image processing, in accordance with the entire area image signal P', which has been obtained from the image processing, and the detection result signal N. Also, in accordance with a request made from the external image display terminal, the output means 30 feeds the information, which is defined in one of (1'), (2'), (3'), and (4') described below, and a layout image signal L', which has been formed by the layout image forming means 40, into the image display terminal:

(1') the entire area image signal P' and the detection result signal N, (2') the entire area image signal P', the detection result signal N, and the region-of-interest image signal W', (3') the embedding entire area image signal P0', and (4') the embedding entire area image signal P', and the region-of-interest image signal W'.

How the fourth embodiment of the first abnormal pattern detection processing system shown in FIG. 4 operates will be described hereinbelow.

Firstly, the entire area image signal P representing the mamma image is fed from an external image forming modality into the abnormal pattern detecting means 10 and the first image processing means 50 of the abnormal pattern detection processing system. The abnormal pattern detecting means 10 performs the abnormal pattern detection processing on the received entire area image signal P, and detects the abnormal pattern P1 embedded in the mamma image. Also, the abnormal pattern detecting means 10 feeds the abnormal pattern signal P1 and the detection result signal N into the region-of-interest setting means 20. Of the abnormal pattern signal P1 and the detection result signal N having been obtained from the abnormal pattern detecting means 10, the detection result signal N is also fed into the layout image forming means 40 and the output means 30.

The first image processing means 50 performs the first image processing on the received entire area image signal P and in accordance with predetermined image processing conditions. The first image processing means 50 feeds the entire area image signal P', which has been obtained from the first image processing, into the layout image forming means 40 and the output means 30.

In accordance with the abnormal pattern signal P1 and the detection result signal N having been received, the region-of-interest setting means 20 sets the rectangular local area limited region, which contains the abnormal pattern P1, as the region-of-interest image W. The region-of-interest setting means 20 feeds the region-of-interest image signal W, which represents the region-of-interest image W having been set, into the second image processing means 60.

The second image processing means 60 performs the second image processing on the region-of-interest image signal W and in accordance with predetermined image processing conditions. The second image processing means 60 feeds the region-of-interest image signal W', which has been obtained from the second image processing, into the layout image forming means 40 and the output means 30.

The layout image forming means 40 forms a layout image L', in which the entire area image P' represented by the entire area image signal P' and the region-of-interest image W' represented by the region-of-interest image signal W' are laid out in the predetermined layout, in accordance with the entire area image signal P' having been received from the first image processing means 50, the region-of-interest image signal W' having been received from the second image processing means 60, and the detection result signal N. The layout image forming means 40 also feeds the layout image signal L', which represents the layout image L', into the output means 30.

In the manner described above, the output means 30 receives the entire area image signal P' having been obtained from the image processing, the region-of-interest image signal W' having been obtained from the image processing, the detection result signal N, and the layout image signal L'. The output means 30 feeds the layout image signal L' together with the information, which is defined in one of (1'), (2'), (3'), and (4') described above, into the external image display terminal and in accordance with a request made from the external image display terminal.

The image display terminal at the output destination receives the information having been fed from the output means 30. The layout image L' represented by the layout image signal L' is displayed as a default image on the image display terminal. In cases where the layout of the displayed layout image L' is not a satisfactory one, the person, who sees the images at the image display terminal, can display the entire area image P' and the region-of-interest image W' in a specific layout on the image display terminal by utilizing the entire area image signal P' and the region-of-interest image signal W' received as components.

As described above, with the fourth embodiment of the first abnormal pattern detection processing system in accordance with the present invention, the information is furnished to the person, who sees the images at the external image display terminal, in the format enabling the person to perform the processing, which is appropriate for the reading of the abnormal pattern, through trial and error at the image display terminal. As a result, a visible image can be obtained, which has good image quality and can serve as an effective tool in, particularly the efficient and accurate diagnosis of an illness.

Figure 5:
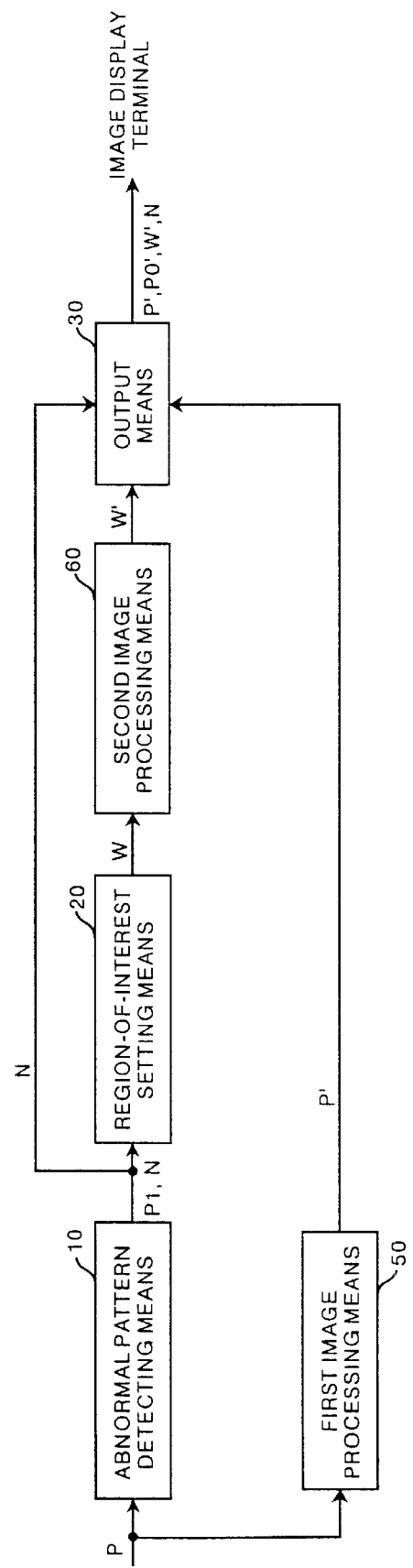
FIG. 5 is a block diagram showing a fifth embodiment of the first abnormal pattern detection processing system in accordance with the present invention.

As in a fifth embodiment shown in FIG. 5, the fourth embodiment of FIG. 4 may be modified such that the default layout image L' is not formed. In the fifth embodiment of FIG. 5, the entire area image signal P' having been obtained from the image processing, the region-of-interest image signal W' having been obtained from the image processing, and the detection result signal N are fed into the output means 30. Also, the output means 30 feeds the information defined in one of (1'), (2'), (3'), and (4') above as components into the image display terminal.

With the fifth embodiment of the first abnormal pattern detection processing system in accordance with the present invention, the information is furnished to the person, who sees the images at the external image display terminal, in the format enabling the person to perform the processing, which is appropriate for the reading of the abnormal pattern, through trial and error at the image display terminal. As a result, a visible image can be obtained, which has good image quality and can serve as an effective tool in, particularly the efficient and accurate diagnosis of an illness.

Also, in the fourth embodiment of FIG. 4, in lieu of the layout image forming means 40, the layout condition setting means 40' shown in FIG. 3 may be employed. In such cases, the same effects as those with each embodiment described above can be obtained.

Figure 6:
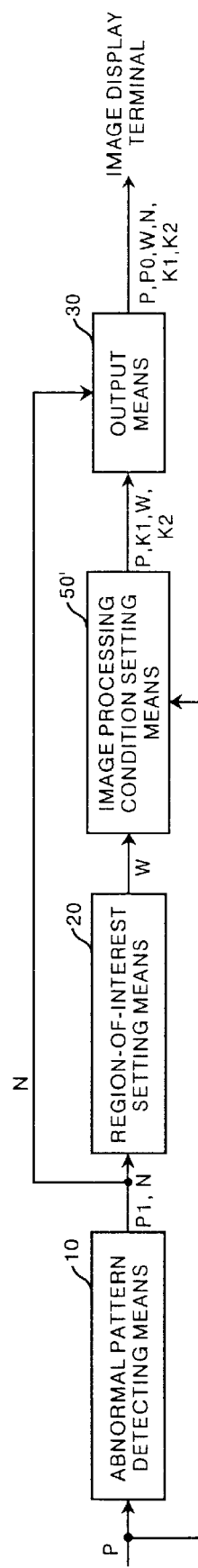
FIG. 6 is a block diagram showing a sixth embodiment of the first abnormal pattern detection processing system in accordance with the present invention.

FIG. 6 is a block diagram showing a sixth embodiment of the first abnormal pattern detection processing system in accordance with the present invention. The sixth embodiment of the first abnormal pattern detection processing system shown in FIG. 6 is constituted basically in the same manner as that in the fifth embodiment of FIG. 5, except that the first image processing means 50 and the second image processing means 60 are replaced by image processing condition setting means 50'. The image processing condition setting means 50' sets image processing conditions (first image processing conditions) K1 for performing image processing, which is appropriate for obtaining an image having good image quality, on the entire area image signal P. The image processing condition setting means 50' also sets image processing conditions (second image processing conditions) K2 for performing image processing, which is appropriate for obtaining an image having good image quality, on the region-of-interest image signal W. Also, in lieu of the information defined in one of (1'), (2'), (3'), and (4') above being fed out from the output means 30, the output means 30 feeds out the information, which defined in one of (1), (2), (3), and (4) above, and signals representing the image processing conditions K1 and K2.

With the sixth embodiment of the first abnormal pattern detection processing system shown in FIG. 6, the signals representing the image processing conditions K1 and K2 are fed into the external image display terminal together with the information, which defined in one of (1), (2), (3), and (4) above. At the image display terminal, specific image processing conditions can be set in accordance with the received image processing conditions K1 and K2 or by making reference to the received image processing conditions K1 and K2, and the image processing can be performed on the received entire area image signal P and the received region-of-interest image signal W. Also, the entire area image and the region-of-interest image, which have been obtained from such a image processing, can be displayed in a specific layout.

As described above, with the sixth-embodiment of the first abnormal pattern detection processing system in accordance with the present invention, the information is furnished to the person, who sees the images at the external image display terminal, in the format enabling the person to perform the processing, which is appropriate for the reading of the abnormal pattern, through trial and error at the image display terminal. As a result, a visible image can be obtained, which has good image quality and can serve as an effective tool in, particularly the efficient and accurate diagnosis of an illness.

The sixth embodiment of FIG. 6 may further comprise the layout image forming means 40 shown in FIG. 4 or the layout condition setting means 40' shown in FIG. 3.

Further, the image processing condition setting means 50' may also have the functions of the first image processing means 50 and the second image processing means 60 shown in FIG. 5.

Figure 7:
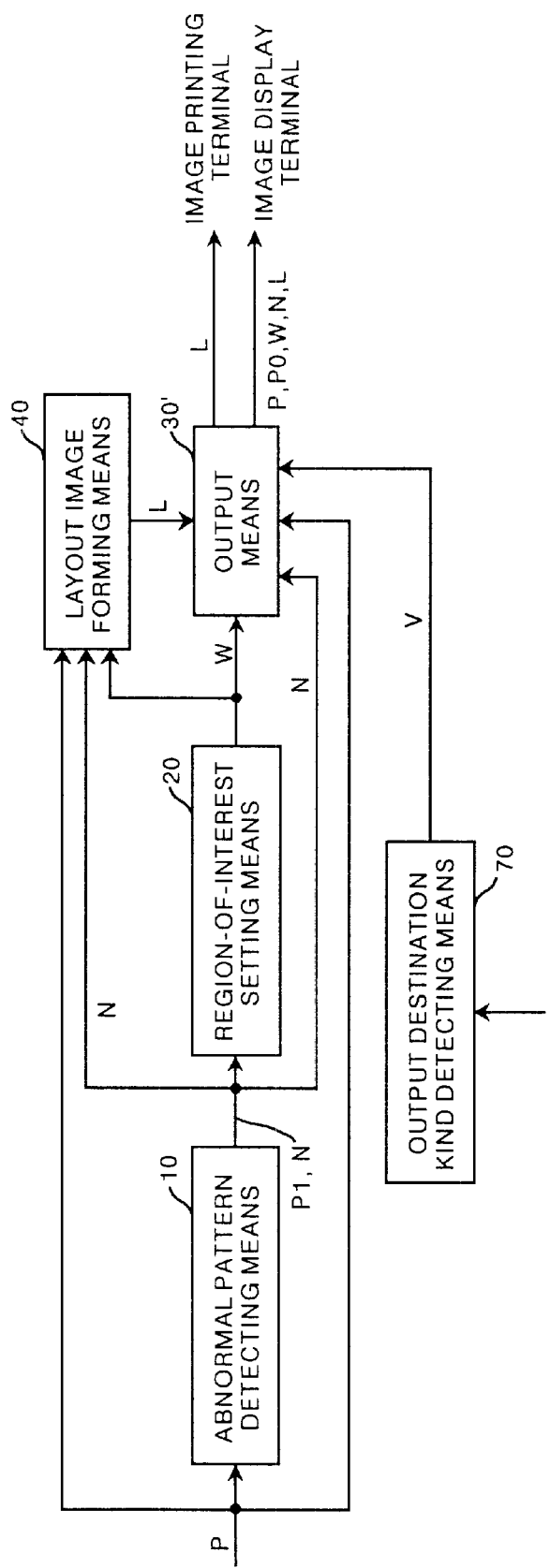
FIG. 7 is a block diagram showing a first embodiment of the second abnormal pattern detection processing system in accordance with the present invention.

FIG. 7 is a block diagram showing a first embodiment of the second abnormal pattern detection processing system in accordance with the present invention. The first embodiment of the second abnormal pattern detection processing system shown in FIG. 7 is constituted basically a in the same manner as that in the second embodiment of the first abnormal pattern detection processing system shown in FIG. 2, except that the output means 30 is replaced by output means 30' for varying the details of the outputted information in accordance with the kind V of the output destination of the information, and the embodiment of FIG. 7 further comprises output destination kind detecting means 70 for discriminating the kind V of the output destination. In cases where the information output destination is the image display terminal, and in cases where the information output destination is an image printing terminal, such as a laser printer, appropriate information is fed out selectively.

Specifically, in cases where the output destination V is the image display terminal, as in the embodiment of FIG. 2, the output means 30' feeds the information, which is defined in one of (1), (2), (3), and (4), and the layout image signal L as components into the image display terminal and in accordance with a request made from the image display terminal. In cases where the output destination V is the image printing terminal, the output means 30' feeds the layout image signal L into the image printing terminal.

The output destination kind detecting means 70 may detect the kind V of the output destination by discriminating the terminal (the image display terminal or the image printing terminal) which has made the output request. Alternatively, the operator, or the like, may give an instruction of the output destination V to the output destination kind detecting means 70, and the output destination kind detecting means 70 may detect the kind V of the output destination from the given instruction.

How the first embodiment of the second abnormal pattern detection processing system shown in FIG. 7 operates will be described hereinbelow. In the same manner as that in the embodiment of FIG. 2, the entire area image signal P, the region-of-interest image signal W, the detection result signal N, and the layout image signal L are fed into the output means 30'.

With the technique described above or with one of other known techniques, the output destination kind detecting means 70 detects whether the information output destination is the image display terminal or the image printing terminal. An output destination signal V, which represents the detected output destination, is fed into the output means 30'.

The output means 30' has already received the entire area image signal P, the region-of-interest image signal W, the detection result signal N, and the layout image signal L. In the same manner as that in the output means 30 in each embodiment described above, the output means 30' forms the embedding entire area image signal P0 from the received entire area image signal P and the received detection result signal N. Also, in cases where the output destination signal V having been received from the output destination kind detecting means 70 represents the image display terminal as the output destination, the output means 30' feeds the layout image signal L together with the information, which is defined in one of (1), (2), (3), and (4) described above, as components into the image display terminal and in accordance with a request made from the external image display terminal. In cases where the output destination signal V having been received from the output destination kind detecting means 70 represents the image printing terminal as the output destination, the output means 30' feeds only the layout image signal L, which is among the signals P, P0, W, N, and L.

As a result, in cases where the information is fed into the image printing terminal, at which it is not expected to perform trial-and-error image reproduction wasting media, such as film, the default layout image L formed by the abnormal pattern detection processing system is reproduced on the medium, such as film. In cases where the information is fed into the image display terminal, the layout image L is displayed as a default image on the image display terminal. In cases where the layout of the displayed layout image L is not a satisfactory one, or in cases where specific image processing is to be performed, the person, who sees the images at the image display terminal, can perform specific image processing on the entire area image signal P and the region-of-interest image signal W in accordance with the entire area image signal P, the region-of-interest image signal W, the detection result signal N, and the like, which have been received as components. Also, the person, who sees the images at the image display terminal, can display an image in a specific layout on the image display terminal by making reference to the detection result signal N and the layout image signal L.

As described above, with the first embodiment of the second abnormal pattern detection processing system in accordance with the present invention, the information to be fed out and other information are changed over in accordance with the kind of the output destination. Therefore, wasting of output media can be prevented. Also, the information is furnished to the person, who sees the images at the external image display terminal, in the format enabling the person to perform the processing, which is appropriate for the reading of the abnormal pattern, through trial and error at the image display terminal. As a result, a visible image can be obtained, which has good image quality and can serve as an effective tool in, particularly the efficient and accurate diagnosis of an illness.

Figure 8:
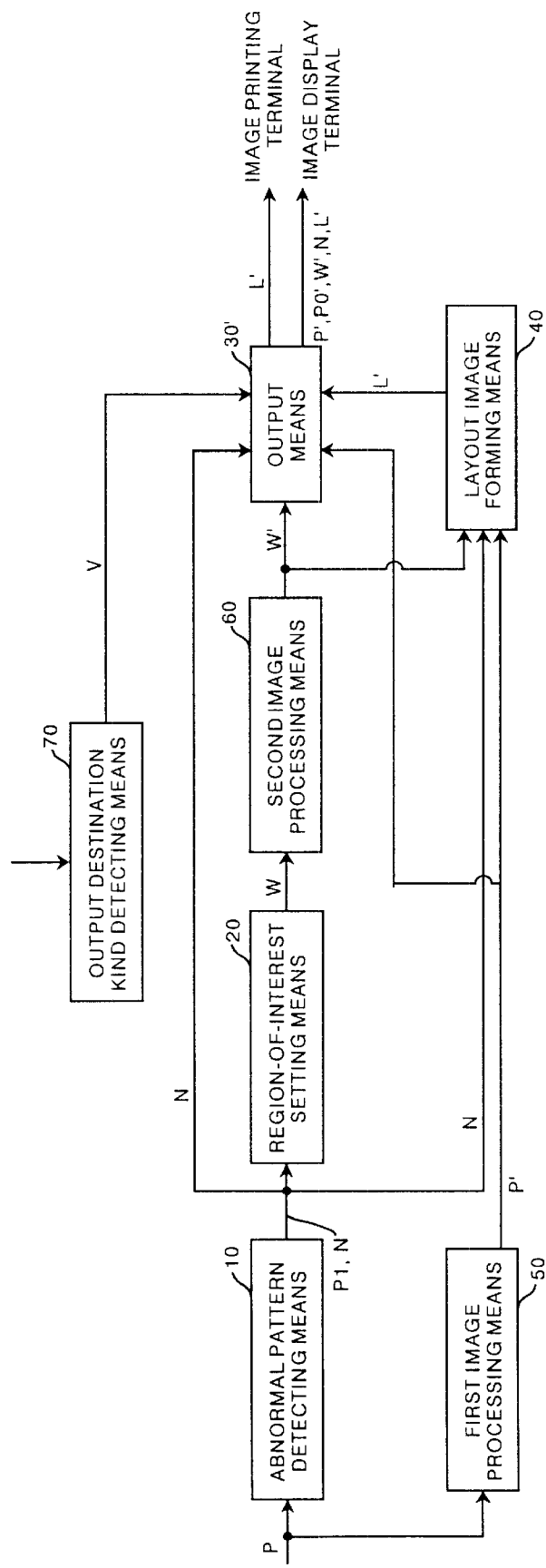
FIG. 8 is a block diagram showing a second embodiment of the second abnormal pattern detection processing system in accordance with the present invention.
Figure 9:
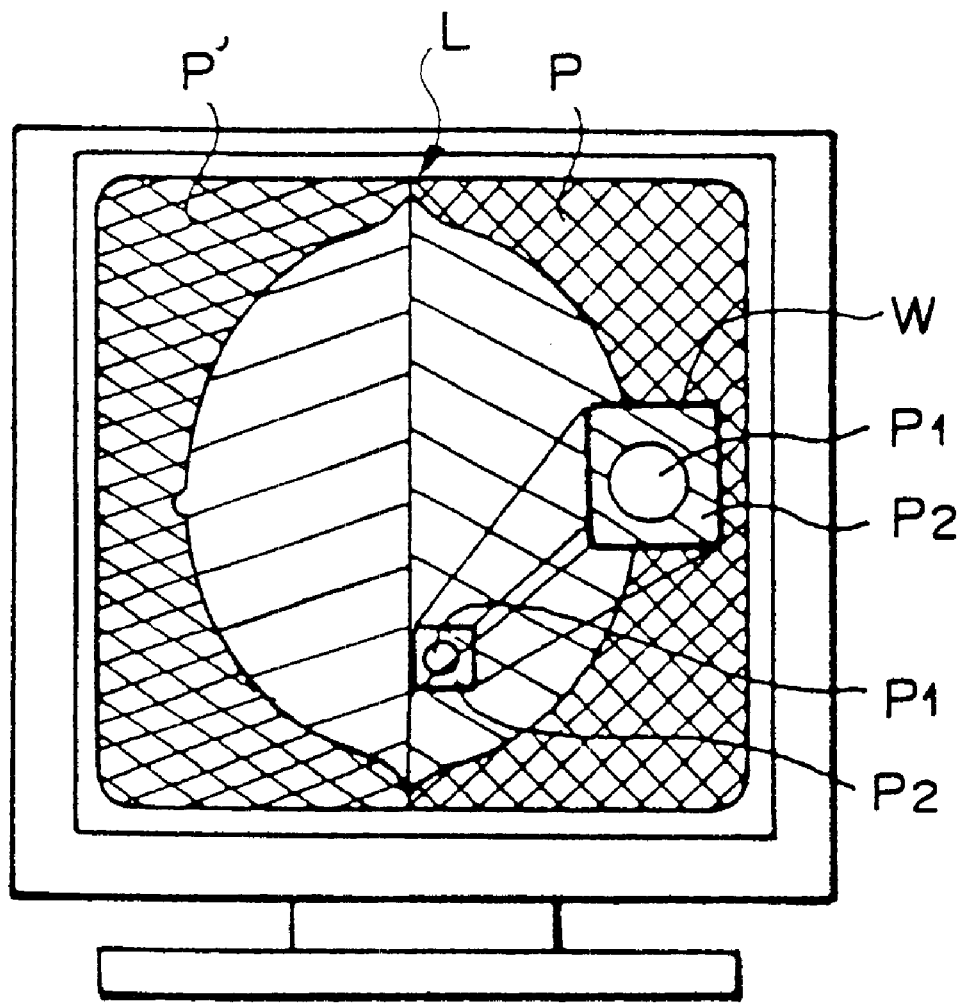
FIG. 9 is an explanatory view showing an example of a layout of an entire area image and a region-of-interest image displayed on an image display terminal.

FIG. 8 is a block diagram showing a second embodiment of the second abnormal pattern detection processing system in accordance with the present invention. The second embodiment of the second abnormal pattern detection processing system shown in FIG. 8 is constituted basically in the same manner as that in the fourth embodiment of the first abnormal pattern detection processing system shown in FIG. 4, except that the output means 30 is replaced by the output means 30' for varying the details of the outputted information in accordance with the kind V of the output destination of the information, and the embodiment of FIG. 8 further comprises the output destination kind detecting means 70 for discriminating the kind V of the output destination.

How the second embodiment of the second abnormal pattern detection processing system shown in FIG. 8 operates will be described hereinbelow. In the same manner as that in the embodiment of FIG. 4, the entire area image signal P', the region-of-interest image signal W', the detection result signal N, and the layout image signal L' are fed into the output means 30'.

With the technique described above or with one of other known techniques, the output destination kind detecting means 70 detects whether the information output destination is the image display terminal or the image printing terminal. An output destination signal V, which represents the detected output destination, is fed into the output means 30'.

The output means 30' has already received the entire area image signal P' having been obtained from the image processing, the region-of-interest image signal W' having been obtained from the image processing, the detection result signal N, and the layout image signal L'. In cases where the output destination signal V having been received from the output destination kind detecting means 70 represents the image display terminal as the output destination, the output means 30' feeds the layout image signal L together with the information, which is defined in one of (1'), (2'), (3'), and (4') described above, as components into the image display terminal and in accordance with a request made from the external image display terminal.

In cases where the output destination signal V having been received from the output destination kind detecting means 70 represents the image printing terminal as the output destination, the output means 30' feeds only the layout image signal L', which is among the signals P', P0', W', N, and L'.

As a result, in cases where the information is fed into the image printing terminal, at which it is not expected to perform trial-and-error image reproduction wasting media, such as film, the default layout image L' formed by the abnormal pattern detection processing system is reproduced on the medium, such as film. In cases where the information is fed into the image display terminal, the layout image L' is displayed as a default image on the image display terminal. In cases where the layout of the displayed layout image L' is not a satisfactory one, the person, who sees the images at the image display terminal, can display the entire area image P' and the region-of-interest image W' in a specific layout on the image display terminal by utilizing the entire area image signal P', the region-of-interest image signal W', and the detection result signal N received as components.

As described above, with the second embodiment of the second abnormal pattern detection processing system in accordance with the present invention, the information to be fed out and other information are changed over in accordance with the kind of the output destination. Therefore, wasting of output media can be prevented. Also, the information is furnished to the person, who sees the images at the external image display terminal, in the format enabling the person to perform the processing, which is appropriate for the reading of the abnormal pattern, through trial and error at the image display terminal. As a result, a visible image can be obtained, which has good image quality and can serve as an effective tool in, particularly the efficient and accurate diagnosis of an illness.

As in the embodiments of the first abnormal pattern detection processing system in accordance with the present invention, which are shown in FIGS. 1 through 6, each of the embodiments of the second abnormal pattern detection processing system in accordance with the present invention shown in FIGS. 7 and 8 may be modified such that the layout condition setting means 40' may be provided in lieu of the layout image forming means 40, such that the layout image forming means 40 and the layout condition setting means 40' are not provided, or such that the image processing condition setting means 50' is provided in lieu of the first image processing means 50 and the second image processing means 60. In such cases, the same effects as those with the embodiments of the first abnormal pattern detection processing system in accordance with the present invention, which are shown in FIGS. 1 through 6, can be obtained.

Figure 10:
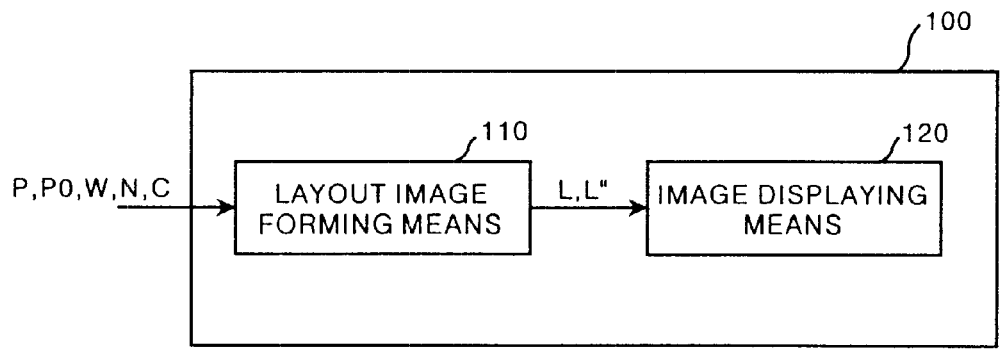
FIG. 10 is a block diagram showing an embodiment of the image display terminal in accordance with the present invention.

FIG. 10 is a block diagram showing an embodiment of the image display terminal in accordance with the present invention. With reference to FIG. 10, an image display terminal 100 reproduces a visible image from the information, which has been received from one of the aforesaid embodiments of the abnormal pattern detection processing systems in accordance with the present invention, and displays the visible image. The image display terminal 100 comprises layout image forming means 110 and image displaying means 120. The layout image forming means 110 forms a layout image L" by laying out (a) the entire area image P, which is represented by the entire area image signal P received from the abnormal pattern detection processing system, or the embedding entire area image P0, which is represented by the embedding entire area image signal P0 received from the abnormal pattern detection processing system, and (b) the region-of-interest image W, which is represented by the region-of-interest image signal W received from the abnormal pattern detection processing system, in a predetermined layout. Alternatively, the layout image forming means 110 forms the layout image L in accordance with the layout condition signal C representing the layout conditions C, which is received from the abnormal pattern detection processing system. The image displaying means 120 displays the layout image L" or the layout image L, which has been formed by the layout image forming means 110, or the information, which is defined in one of (1), (2), (3), and (4) above, which has been received as components from the abnormal pattern detection processing system.

With this embodiment of the image display terminal 100, the layout image forming means 110 can form the layout image L" freely in accordance with the received information. Alternatively, the layout image forming means 110 can form the layout image L in accordance with the received layout conditions C. Therefore, an image matched to the preference of each operator, such as a medical doctor, who sees the images displayed by the image displaying means 120 of the image display terminal 100, can be obtained.

Figure 11:
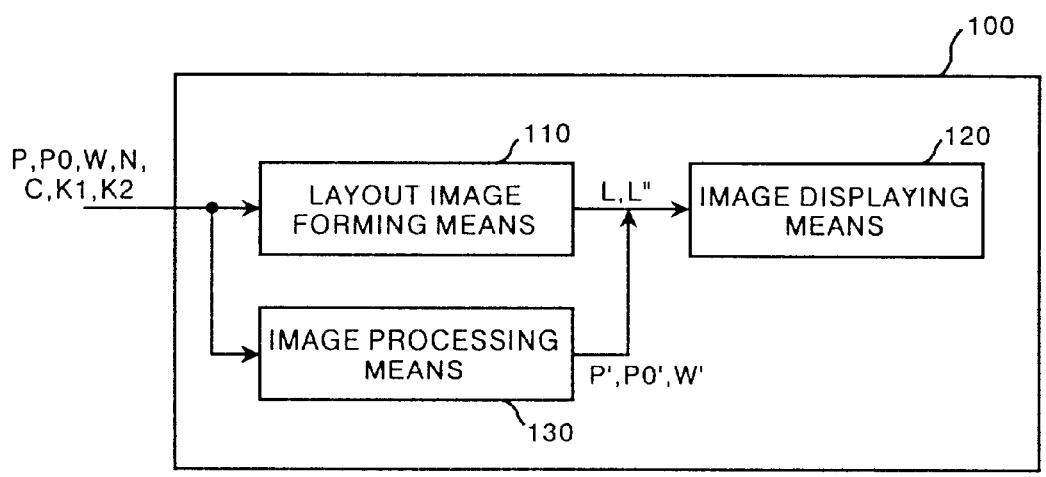
FIG. 11 is a block diagram showing a different embodiment of the image display terminal in accordance with the present invention.

FIG. 11 is a block diagram showing a different embodiment of the image display terminal in accordance with the present invention. The embodiment of the image display terminal shown in FIG. 11 is constituted basically in the same manner as that in the embodiment of FIG. 10, except that the embodiment of FIG. 11 further comprises image processing means 130. The image processing means 130 performs image processing on the information, which has been received from the abnormal pattern detection processing system, and in accordance with desired image processing conditions. Alternatively, the image processing means 130 performs image processing on the entire area image signal P or the embedding entire area image signal P0 and in accordance with image processing conditions K1, which have been received from the abnormal pattern detection processing system, and image processing on the region-of-interest image signal W and in accordance with image processing conditions K2, which have been received from the abnormal pattern detection processing system.

With the image display terminal 100, the operator can freely perform the image processing with the image processing means 130 and on the entire area image signal P, the embedding entire area image signal P0, the region-of-interest image signal W, and the like, which have been received as components from the abnormal pattern detection processing system. Also, the operator can perform the image processing in accordance with the received image processing conditions K1 and K2. Therefore, a visible image appropriate for the person, who sees the images, can be displayed by the image displaying means 120.

In cases where the entire area image signal P' having been obtained from image processing, and the like, and the image processing condition signal K1, which represents the image processing conditions K1 having been used for the image processing, and the like, are received from the abnormal pattern detection processing system, if the details of the image processing having been performed by the abnormal pattern detection processing system are not the satisfactory ones, inverse image processing can be performed by the image processing means 130 and in accordance with the received image processing conditions K1, and the like, and the entire area image signal P' having been obtained from the image processing, and the like. In this manner, the entire area image signal P before being subjected to the image processing, and the like, can be obtained. Specific image processing can then be performed on the entire area image signal P having been returned to the state before being subjected to the image processing, and the like. Accordingly, a visible image can be obtained, which has good image quality and can serve as an effective tool in, particularly the efficient and accurate diagnosis of an illness.

What is claimed is:

1. An abnormal pattern detection processing method, comprising the steps of:
   i) performing abnormal pattern detection processing on a received entire area image signal, which represents an entire area image, an abnormal pattern embedded in said entire area image being thereby detected,
   ii) setting a local area limited region, which is constituted of the detected abnormal pattern and a region neighboring with the abnormal pattern, as a region-of-interest image, and
   iii) feeding information defined in one of (1), (2), (3), and (4) into an external image display terminal:
      (1) said entire area image signal and a detection result signal, which represents detection results of the abnormal pattern having been detected, (2) said entire area image signal, said detection result signal, and a region-of-interest image signal, which represents said region-of-interest image, (3) an embedding entire area image signal representing an embedding entire area image, which is formed by embedding the detection results of the abnormal pattern into said entire area image, and (4) said embedding entire area image signal and said region-of-interest image signal.

2. A method as defined in claim 1 wherein the method further comprises the step of forming a layout image, in which (a) said entire area image or said embedding entire area image and (b) said region-of-interest image are laid out in a predetermined layout, and a layout image signal, which represents said layout image having been formed, is fed into said external image display terminal together with the information to be fed into said external image display terminal.

3. A method as defined in claim 1 wherein the method further comprises the step of setting layout conditions for forming a predetermined layout image from (a) said entire area image or said embedding entire area image and (b) said region-of-interest image, and in cases where the information defined in either one of (2) and (4) is to be fed into said external image display terminal, a layout condition signal representing said layout conditions, which have been set, is fed together with said information defined in either one of (2) and (4) into said image display terminal.

4. A method as defined in claim 2 wherein the method further comprises the steps of: performing first image processing on said entire area image signal or said embedding entire area image signal, and performing second image processing on said region-of-interest image signal, said entire area image, which constitutes said layout image, is an entire area image having been obtained from said first image processing, or said embedding entire area image, which constitutes said layout image, is an embedding entire area image having been obtained from said first image processing, said region-of-interest image, which constitutes said layout image, is a region-of-interest image having been obtained from said second image processing, said entire area image signal, which is to be fed into said external image display terminal, is an entire area image signal having been obtained from said first image processing, or said embedding entire area image signal, which is to be fed into said external image display terminal, is an embedding entire area image signal having been obtained from said first image processing, and said region-of-interest image signal, which is to be fed into said external image display terminal, is a region-of-interest image signal having been obtained from said second image processing.

5. A method as defined in claim 1 wherein the method further comprises the steps of: performing first image processing on said entire area image signal or said embedding entire area image signal, and performing second image processing on said region-of-interest image signal, said entire area image signal, which is to be fed into said external image display terminal, is an entire area image signal having been obtained from said first image processing, or said embedding entire area image signal, which is to be fed into said external image display terminal, is an embedding entire area image signal having been obtained from said first image processing, and said region-of-interest image signal, which is to be fed into said external image display terminal, is a region-of-interest image signal having been obtained from said second image processing.

6. A method as defined in claim 3 wherein the method further comprises the steps of: performing first image processing on said entire area image signal or said embedding entire area image signal, and performing second image processing on said region-of-interest image signal, said entire area image signal, which is to be fed into said external image display terminal, is an entire area image signal having been obtained from said first image processing, or said embedding entire area image signal, which is to be fed into said external image display terminal, is an embedding entire area image signal having been obtained from said first image processing, and said region-of-interest image signal, which is to be fed into said external image display terminal, is a region-of-interest image signal having been obtained from said second image processing.

7. A method as defined in claim 1, 2, 3, 4, 5, or 6 wherein the method further comprises the steps of: setting processing conditions for first image processing, which is to be performed on said entire area image signal or said embedding entire area image signal, and setting processing conditions for second image processing, which is to be performed on said region-of-interest image signal, and a signal representing said processing conditions for said first image processing, which have been set, and a signal representing said processing conditions for said second image processing, which have been set, are fed into said external image display terminal together with the information to be fed into said external image display terminal.

8. An abnormal pattern detection processing method, comprising the steps of:

i) performing abnormal pattern detection processing on a received entire area image signal, which represents an entire area image, an abnormal pattern embedded in said entire area image being thereby detected, ii) setting a local area limited region, which is constituted of the detected abnormal pattern and a region neighboring with the abnormal pattern, as a region-of-interest image, iii) detecting a kind of an external output destination, iv) in cases where the detected output destination is an image display terminal, feeding information defined in one of (1), (2), (3), and (4) into said image display terminal:

(1) said entire area image signal and a detection result signal, which represents detection results of the abnormal pattern having been detected, (2) said entire area image signal, said detection result signal, and a region-of-interest image signal, which represents said region-of-interest image, (3) an embedding entire area-image signal representing an embedding entire area image, which is formed by embedding the detection results of the abnormal pattern into said entire area image, and (4) said embedding entire area image signal and said region-of-interest image signal, and v) in cases where the detected output destination is an image printing terminal, feeding the information defined in either one of (3) and (4) into said image printing terminal.

9. A method as defined in claim 8 wherein the method further comprises the step of forming a layout image, in which (a) said entire area image or said embedding entire area image and (b) said region-of-interest image are laid out in a predetermined layout, and a layout image signal, which represents said layout image having been formed, is fed into either one of said external image display terminal and said external image printing terminal together with the information to be fed into said either one of said external image display terminal and said image printing terminal.

10. A method as defined in claim 8 wherein the method further comprises the step of setting layout conditions for forming a predetermined layout image from (a) said entire area image or said embedding entire area image and (b) said region-of-interest image, and in cases where the detected output destination is said image display terminal and the information defined in either one of (2) and (4) is to be fed into said image display terminal, a layout condition signal representing said layout conditions, which have been set, is fed together with said information defined in either one of (2) and (4) into said image display terminal.

11. A method as defined in claim 9 wherein the method further comprises the steps of: performing first image processing on said entire area image signal or said embedding entire area image signal, and performing second image processing on said region-of-interest image signal, said entire area image, which constitutes said layout image, is an entire area image having been obtained from said first image processing, or said embedding entire area image, which constitutes said layout image, is an embedding entire area image having been obtained from said first image processing, said region-of-interest image, which constitutes said layout image, is a region-of-interest image having been obtained from said second image processing, said entire area image signal, which is to be fed into the output destination, is an entire area image signal having been obtained from said first image processing, or said embedding entire area image signal, which is to be fed into the output destination, is an embedding entire area image signal having been obtained from said first image processing, and said region-of-interest image signal, which is to be fed into the output destination, is a region-of-interest image signal having been obtained from said second image processing.

12. A method as defined in claim 8 wherein the method further comprises the steps of: performing first image processing on said entire area image signal or said embedding entire area image signal, and performing second image processing on said region-of-interest image signal, said entire area image signal, which is to be fed into the output destination, is an entire area image signal having been obtained from said first image processing, or said embedding entire area image signal, which is to be fed into the output destination, is an embedding entire area image signal having been obtained from said first image processing, and said region-of-interest image signal, which is to be fed into the output destination, is a region-of-interest image signal having been obtained from said second image processing.

13. A method as defined in claim 10 wherein the method further comprises the steps of: performing first image processing on said entire area image signal or said embedding entire area image signal, and performing second image processing on said region-of-interest image signal, said entire area image signal, which is to be fed into the output destination, is an entire area image signal having been obtained from said first image processing, or said embedding entire area image signal, which is to be fed into the output destination, is an embedding entire area image signal having been obtained from said first image processing, and said region-of-interest image signal, which is to be fed into the output destination, is a region-of-interest image signal having been obtained from said second image processing.

14. A method as defined in claim 8, 9, 10, 11, 12, or 13 wherein the method further comprises the steps of: setting processing conditions for first image processing, which is to be performed on said entire area image signal or said embedding entire area image signal, and setting processing conditions for second image processing, which is to be performed on said region-of-interest image signal, and in cases where the detected output destination is said image display terminal, a signal representing said processing conditions for said first image processing, which have been set, and a signal representing said processing conditions for said second image processing, which have been set, are fed into said image display terminal together with the information to be fed into said image display terminal.

15. A method as defined in claim 1, 2, 3, 4, 5, 6, 8, 9, 10, 11, 12, or 13 wherein the abnormal pattern detection processing is the processing utilizing an iris filter for detecting an image area, which is associated with a high degree of centralization of image density gradient vectors, as an abnormal pattern, and/or the processing utilizing a morphology filter for detecting an image area, at which the image density changes in a range spatially narrower than a multi-structure element, as an abnormal pattern.

16. A method as defined in claim 1, 2, 3, 4, 5, 6, 8, 9, 10, 11, 12, or 13 wherein the image signal representing an object image to be subjected to the abnormal pattern detection processing is a mamma image signal.

17. An abnormal pattern detection processing system, comprising:

i) abnormal pattern detecting means for performing abnormal pattern detection processing on a received entire area image signal, which represents an entire area image, and thereby detecting an abnormal pattern embedded in said entire area image, ii) region-of-interest setting means for setting a local area limited region, which is constituted of the detected abnormal pattern and a region neighboring with the abnormal pattern, as a region-of-interest image, and iii) output means for feeding information defined in one of (1), (2), (3), and (4) into an external image display terminal:

(1) said entire area image signal and a detection result signal, which represents detection results of the abnormal pattern having been detected, (2) said entire area image signal, said detection result signal, and a region-of-interest image signal, which represents said region-of-interest image, (3) an embedding entire area image signal representing an embedding entire area image, which is formed by embedding the detection results of the abnormal pattern into said entire area image, and (4) said embedding entire area image signal and said region-of-interest image signal.

18. A system as defined in claim 17 wherein the system further comprises layout image forming means for forming a layout image, in which (a) said entire area image or said embedding entire area image and (b) said region-of-interest image are laid out in a predetermined layout, and said output means feeds a layout image signal, which represents said layout image having been formed by said layout image forming means, into said external image display terminal together with the information to be fed into said external image display terminal.

19. A system as defined in claim 17 wherein the system further comprises layout condition setting means for forming a predetermined layout image from (a) said entire area image or said embedding entire area image and (b) said region-of-interest image, and in cases where the information defined in either one of (2) and (4) is to be fed into said external image display terminal, said output means feeds a layout condition signal representing said layout conditions, which have been set by said layout condition setting means, together with said information defined in either one of (2) and (4) into said image display terminal.

20. A system as defined in claim 18 wherein the system further comprises: first image processing means for performing first image processing on said entire area image signal or said embedding entire area image signal, and second image processing means for performing second image processing on said region-of-interest image signal, said entire area image, which constitutes said layout image, is an entire area image having been obtained from said first image processing, or said embedding entire area image, which constitutes said layout image, is an embedding entire area image having been obtained from said first image processing, said region-of-interest image, which constitutes said layout image, is a region-of-interest image having been obtained from said second image processing, said entire area image signal, which is to be fed from said output means into said external image display terminal, is an entire area image signal having been obtained from said first image processing, or said embedding entire area image signal, which is to be fed from said output means into said external image display terminal, is an embedding entire area image signal having been obtained from said first image processing, and said region-of-interest image signal, which is to be fed from said output means into said external image display terminal, is a region-of-interest image signal having been obtained from said second image processing.

21. A system as defined in claim 17 wherein the system further comprises: first image processing means for performing first image processing on said entire area image signal or said embedding entire area image signal, and second image processing means for performing second image processing on said region-of-interest image signal, said entire area image signal, which is to be fed from said output means into said external image display terminal, is an entire area image signal having been obtained from said first image processing, or said embedding entire area image signal, which is to be fed from said output means into said external image display terminal, is an embedding entire area image signal having been obtained from said first image processing, and said region-of-interest image signal, which is to be fed from said output means into said external image display terminal, is a region-of-interest image signal having been obtained from said second image processing.

22. A system as defined in claim 19 wherein the system further comprises: first image processing means for performing first image processing on said entire area image signal or said embedding entire area image signal, and second image processing means for performing second image processing on said region-of-interest image signal, said entire area image signal, which is to be fed from said output means into said external image display terminal, is an entire area image signal having been obtained from said first image processing, or said embedding entire area image signal, which is to be fed from said output means into said external image display terminal, is an embedding entire area image signal having been obtained from said first image processing, and said region-of-interest image signal, which is to be fed from said output means into said external image display terminal, is a region-of-interest image signal having been obtained from said second image processing.

23. A system as defined in claim 17, 18, 19, 20, 21, or 22 wherein the system further comprises image processing condition setting means for setting processing conditions for first image processing, which is to be performed on said entire area image signal or said embedding entire area image signal, and setting processing conditions for second image processing, which is to be performed on said region-of-interest image signal, and said output means feeds a signal representing said processing conditions for said first image processing, which have been set by said image processing condition setting means, and a signal representing said processing conditions for said second image processing, which have been set by said image processing condition setting means, into said external image display terminal together with the information to be fed into said external image display terminal.

24. An abnormal pattern detection processing system, comprising:

i) abnormal pattern detecting means for performing abnormal pattern detection processing on a received entire area image signal, which represents an entire area image, and thereby detecting an abnormal pattern embedded in said entire area image, ii) region-of-interest setting means for setting a local area limited region, which is constituted of the detected abnormal pattern and a region neighboring with the abnormal pattern, as a region-of-interest image, iii) output destination kind detecting means for detecting a kind of an external output destination, and iv) output means for operating such that, in cases where the detected output destination is an image display terminal, said output means feeds information defined in one of (1), (2), (3), and (4) into said image display terminal:

(1) said entire area image signal and a detection result signal, which represents detection results of the abnormal pattern having been detected, (2) said entire area image signal, said detection result signal, and a region-of-interest image signal, which represents said region-of-interest image, (3) an embedding entire area image signal representing an embedding entire area image, which is formed by embedding the detection results of the abnormal pattern into said entire area image, and (4) said embedding entire area image signal and said region-of-interest image signal, and such that, in cases where the detected output destination is an image printing terminal, said output means feeds the information defined in either one of (3) and (4) into said image printing terminal.

25. A system as defined in claim 24 wherein the system further comprises layout image forming means for forming a layout image, in which (a) said entire area image or said embedding entire area image and (b) said region-of-interest image are laid out in a predetermined layout, and said output means feeds a layout image signal, which represents said layout image having been formed by said layout image forming means, into either one of said external image display terminal and said external image printing terminal together with the information to be fed into said either one of said external image display terminal and said image printing terminal.

26. A system as defined in claim 24 wherein the system further comprises layout condition setting means for setting layout conditions for forming a predetermined layout image from (a) said entire area image or said embedding entire area image and (b) said region-of-interest image, and in cases where the detected output destination is said image display terminal and the information defined in either one of (2) and (4) is to be fed from said output means into said image display terminal, said output means feeds a layout condition signal representing said layout conditions, which have been set by said layout condition setting means, together with said information defined in either one of (2) and (4) into said image display terminal.

27. A system as defined in claim 25 wherein the system further comprises first image processing means for performing first image processing on said entire area image signal or said embedding entire area image signal, and second image processing means for performing second image processing on said region-of-interest image signal, said entire area image, which constitutes said layout image, is an entire area image having been obtained from said first image processing, or said embedding entire area image, which constitutes said layout image, is an embedding entire area image having been obtained from said first image processing, said region-of-interest image, which constitutes said layout image, is a region-of-interest image having been obtained from said second image processing, said entire area image signal, which is to be fed from said output means into the output destination, is an entire area image signal having been obtained from said first image processing, or said embedding entire area image signal, which is to be fed from said output means into the output destination, is an embedding entire area image signal having been obtained from said first image processing, and said region-of-interest image signal, which is to be fed from said output means into the output destination, is a region-of-interest image signal having been obtained from said second image processing.

28. A system as defined in claim 24 wherein the system further comprises first image processing means for performing first image processing on said entire area image signal or said embedding entire area image signal, and second image processing means for performing second image processing on said region-of-interest image signal, said entire area image signal, which is to be fed from said output means into the output destination, is an entire area image signal having been obtained from said first image processing, or said embedding entire area image signal, which is to be fed from said output means into the output destination, is an embedding entire area image signal having been obtained from said first image processing, and said region-of-interest image signal, which is to be fed from said output means into the output destination, is a region-of-interest image signal having been obtained from said second image processing.

29. A system as defined in claim 26 wherein the system further comprises first image processing means for performing first image processing on said entire area image signal or said embedding entire area image signal, and second image processing means for performing second image processing on said region-of-interest image signal, said entire area image signal, which is to be fed from said output means into the output destination, is an entire area image signal having been obtained from said first image processing, or said embedding entire area image signal, which is to be fed from said output means into the output destination, is an embedding entire area image signal having been obtained from said first image processing, and said region-of-interest image signal, which is to be fed from said output means into the output destination, is a region-of-interest image signal having been obtained from said second image processing.

30. A system as defined in claim 24, 25, 26, 27, 28, or 29 wherein the system further comprises image processing condition setting means for setting processing conditions for first image processing, which is to be performed on said entire area image signal or said embedding entire area image signal, and setting processing conditions for second image processing, which is to be performed on said region-of-interest image signal, and in cases where the detected output destination is said image display terminal, said output means feeds a signal representing said processing conditions for said first image processing, which have been set by said image processing condition setting means, and a signal representing said processing conditions for said second image processing, which have been set by said image processing condition setting means, into said image display terminal together with the information to be fed into said image display terminal.

31. A system as defined in claim 17, 18, 19, 20-, 21, 22, 24, 25, 26, 27, 28, or 29 wherein said abnormal pattern detecting means is the means utilizing an iris filter for detecting an image area, which is associated with a high degree of centralization of image density gradient vectors, as an abnormal pattern, and/or the means utilizing a morphology filter for detecting an image area, at which the image density changes in a range spatially narrower than a multi-structure element, as an abnormal pattern.

32. A system as defined in claim 17, 18, 19, 20, 21, 22, 24, 25, 26, 27, 28, or 29 wherein the image signal representing an object image to be subjected to the abnormal pattern detection processing performed by said abnormal pattern detecting means is a mamma image signal.

33. An image display terminal for reproducing a visible image from the information, which has been received from an abnormal pattern detection processing system as defined in claim 17, 18, 19, 20, 21, 22, 24, 25, 26, 27, 28, or 29, and displaying the visible image, comprising:

i) layout image forming means for forming a layout image by laying out:

(a) said entire area image, which is represented by said entire area image signal received from the abnormal pattern detection processing system, or said embedding entire area image, which is represented by said embedding entire area image signal received from the abnormal pattern detection processing system, and (b) said region-of-interest image, which is represented by said region-of-interest image signal received from the abnormal pattern detection processing system, in a predetermined layout, or for forming a layout image in accordance with a layout condition signal representing layout conditions, which is received from the abnormal pattern detection processing system, and ii) means for displaying the layout image, which has been formed by said layout image forming means.

34. An image display terminal as defined in claim 33 wherein the image display terminal further comprises image processing means for performing image processing on the information, which has been received from the abnormal pattern detection processing system, and in accordance with desired image processing conditions, or for performing:

first image processing on said entire area image signal or said embedding entire area image signal and in accordance with processing conditions for the first image processing, which have been received from the abnormal pattern detection processing system, and second image processing on said region-of-interest image signal and in accordance with processing conditions for the second image processing, which have been received from the abnormal pattern detection processing system.

* * * * *